US011900812B2

(12) United States Patent
Morimura et al.

(10) Patent No.: US 11,900,812 B2
(45) Date of Patent: *Feb. 13, 2024

(54) VEHICLE CONTROL DEVICE

(71) Applicant: TOYOTA JIDOSHA KABUSHIKI KAISHA, Toyota (JP)

(72) Inventors: Junichi Morimura, Shizuoka-ken (JP); Junya Watanabe, Shizuoka-ken (JP); Seiji Arakawa, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/562,759

(22) Filed: Dec. 27, 2021

(65) Prior Publication Data

US 2022/0122462 A1 Apr. 21, 2022

Related U.S. Application Data

(63) Continuation of application No. 16/847,910, filed on Apr. 14, 2020, now Pat. No. 11,631,330, which is a (Continued)

(30) Foreign Application Priority Data

Nov. 9, 2017 (JP) ................................ 2017-216407

(51) Int. Cl.

*G08G 1/005* (2006.01)
*G08G 1/096* (2006.01)

(Continued)

(52) U.S. Cl.

CPC ........... *G08G 1/166* (2013.01); *G08G 1/0125* (2013.01); *G08G 1/0137* (2013.01);

(Continued)

(58) Field of Classification Search

CPC .. G08G 1/09623; G08G 1/0125; G08G 1/166; G08G 1/005; G08G 1/0137;

(Continued)

(56) References Cited

U.S. PATENT DOCUMENTS 6,396,395 B1 5/2002 Zielinski et al.
6,813,554 B1 * 11/2004 Ebert .................... G09F 27/00 701/117

(Continued)

FOREIGN PATENT DOCUMENTS

CA 2904456 C 11/2020
IL 172989 A * 9/2016 ............... G06F 7/00

(Continued)

OTHER PUBLICATIONS

M. Iryo-Asano, W. K. M. Alhajyaseen and H. Nakamura, "Analysis and Modeling of Pedestrian Crossing Behavior During the Pedestrian Flashing Green Interval," in IEEE Transactions on Intelligent Transportation Systems, vol. 16, No. 2, pp. 958-969, Apr. 2015, doi: 10.1109/TITS.2014.2346154. (Year: 2015).*

(Continued)

*Primary Examiner* — Cuong H Nguyen
(74) *Attorney, Agent, or Firm* — Sughrue Mion, PLLC

(57) ABSTRACT

A vehicle control device includes an external situation recognition unit configured to recognize a crossing person who crosses over a path of a vehicle and acquire information on the crossing person and information on an environment where the crossing person crosses, a scheduled departure time deciding unit configured to decide a scheduled departure time of the vehicle based on the information on the crossing person and the environment where the crossing person crosses when the crossing person is recognized by the external situation recognition unit, and an informing controller configured to perform a control to inform an (Continued)

outside of the vehicle of the scheduled departure time. The scheduled departure time deciding unit predicts a crossing completion time at which the crossing person recognized by the external situation recognition unit completes the crossing and decides the scheduled departure time based on the crossing completion time.

12 Claims, 19 Drawing Sheets

Related U.S. Application Data continuation of application No. 16/167,883, filed on Oct. 23, 2018, now Pat. No. 10,657,822.

(51) Int. Cl.
*G08G 1/16* (2006.01)
*G08G 1/0967* (2006.01)
*G08G 1/01* (2006.01)

(52) U.S. Cl.
CPC ................. *G08G 1/096716* (2013.01); *G05D 2201/0213* (2013.01); *G08G 1/096783* (2013.01)

(58) Field of Classification Search
CPC ............. G08G 1/096716; G08G 1/096; G08G 1/096783; G05D 2201/0213; G06V 20/58
USPC .......................................................... 701/117
See application file for complete search history.

(56) References Cited

U.S. PATENT DOCUMENTS

| | | | |
|---|---|---|---|
| 6,900,740 B2 | 5/2005 | Bloomquist | |
| 9,336,436 B1 | 5/2016 | Dowdall | |
| 9,718,405 B1 | 8/2017 | Englander et al. | |
| 9,930,120 B2 | 3/2018 | Gutierrez | |
| 10,147,320 B1 * | 12/2018 | Ellis | G01S 17/931 |
| 10,365,657 B2 | 7/2019 | Tokyuama | |
| 10,657,822 B2 | 5/2020 | Morimura | |
| 11,036,222 B2 * | 6/2021 | Belloni Mourao | G05D 1/0077 |
| 2004/0193347 A1 | 9/2004 | Harumoto et al. | |
| 2005/0073433 A1 | 4/2005 | Gunderson | |
| 2005/0090975 A1 | 4/2005 | Mueller | |
| 2007/0008178 A1 * | 1/2007 | Lo | G08G 1/096 340/907 |
| 2007/0182528 A1 | 8/2007 | Breed | |
| 2008/0119993 A1 | 5/2008 | Breed | |
| 2008/0162027 A1 * | 7/2008 | Murphy | G05D 1/0274 701/1 |
| 2015/0094878 A1 | 4/2015 | Miura et al. | |
| 2016/0180703 A1 * | 6/2016 | Chang | H04W 4/021 340/944 |
| 2016/0231746 A1 | 8/2016 | Hazelton et al. | |
| 2017/0017237 A1 | 1/2017 | Tokuyama | |
| 2018/0061243 A1 | 3/2018 | Shloosh | |
| 2018/0173237 A1 * | 6/2018 | Reiley | B60Q 1/46 |
| 2019/0061748 A1 | 2/2019 | Baba | |
| 2019/0100196 A1 * | 4/2019 | Ueda | B60W 10/18 |
| 2019/0139414 A1 | 5/2019 | Morimura | |
| 2020/0242939 A1 | 7/2020 | Morimura | |
| 2021/0078598 A1 * | 3/2021 | Kim | G06V 40/10 |

FOREIGN PATENT DOCUMENTS

| | | | |
|---|---|---|---|
| JP | 2013-149296 A | 8/2013 | |
| JP | 2015-072570 A | 4/2015 | |
| JP | 2016-511278 A | 4/2017 | |
| JP | 6572205 B2 | 9/2019 | |
| KR | 20150137355 A * | 12/2015 | G08G 1/005 |
| WO | 03016823 A1 | 2/2003 | |
| WO | 2014115139 A1 | 7/2014 | |
| WO | 2015-151266 A1 | 10/2015 | |

OTHER PUBLICATIONS

Pedestrian Crossing Behaviour Analysis at Intersections; by Akash Jain et al.; International Journal for Traffic and Transport Engineering, 2014, 4(1): 103-116 (Year: 2014).*

Pedestrian Crossing Speed: The Case of Malaysia; by Boon Hoe Goh et al.; DOI: http://dx.doi.org/10.7708/ijtte.2012.2(4).03. (Year: 2012).*

Pedestrian Crossing Behavior at Signalized Crosswalks; S.Q. Xie et al; Journal of Transportation Engineering , v. 143, p. 04017036 (Year: 2017).*

Video-Based Monitoring of Pedestrian Movements at Signalized Intersections; by Yegor Malinovskiy et al.; Journal of the Transportation Research Board, No. 2073, Transportation Research Board of the National Academies, Washington, D.C., 2008, pp. 11-17. (Year: 2008).*

Tobias Lagstrom et al.; "AVIP—Autonomous Vehicles' Interaction with Pedestrians", Chalmers University of Technology, Gothenborg, Sweden 2015. (Year: 2015).*

Iryo-Asano, Miho, Wael KM Alhajyaseen, and Hideki Nakamura. "Analysis and modeling of pedestrian crossing behavior during the pedestrian flashing green interval." IEEE Transactions on Intelligent Transportation Systems 16.2 (2014): 958-969 (Year: 2014).*

S. Zhang, M. Abdel-Aty, Y. Wu and O. Zheng, "Pedestrian Crossing Intention Prediction at Red-Light Using Pose Estimation," in IEEE Transactions on Intelligent Transportation Systems, vol. 23, No. 3, pp. 2331-2339, Mar. 2022, doi: 10.1109/TITS.2021.3074829 (Year: 2022).*

G. Strle, A. Košir, J. Sodnik and K. S. Peenik, "Physiological Signals as Predictors of Cognitive Load Induced by the Type of Automotive Head-Up Display," in IEEE Access, vol. 11, pp. 87835-87848, 2023, doi: 10.1109/ACCESS.2023.3305383 (Year: 2023).*

G. Marta et al., "Wearable Biofeedback Suit to Promote and Monitor Aquatic Exercises: A Feasibility Study," in IEEE Transactions on Instrumentation and Measurement, vol. 69, No. 4, pp. 1219-1231, Apr. 2020, doi: 10.1109/TIM.2019.2911756 (Year: 2020).*

AVIP—Autonomous vehicles' interaction with pedestrians, by Tobias Lagstrom et al., Master of Science Thesis in the Master Degree Program Industrial Design Engineering, Chalmers University of Technology, Gothenborg, Sweden 2015. (Year: 2015).

Chia-Ming Chang et al.; 2017. Eyes on a Car: An Interface Design for Communication Between an Autonomous Car and a Pedestrian. In Proceedings of the 9th International Conference on Automotive User Interfaces and Interactive Vechicular Applications (AutomotiveUI '17) ACM, New York, NY USA , 65-73. (Year: 2017).

Identification of External Design Preferences in Autonomous Vehicles, Shuchisnigdha Deb et al., Proceedings of the 2016 Industrial and Systems Engineering Research Conferences. (Year: 2016).

Investigating the Influence of External Car Displays on Pedestrians' Crossing Behavior in Virtual Reality, Kai Hollander et al., MobileHCI '19, Oct. 1-4, 2019, Taipei, Taiwan(Year 2019) (Year: 2019).

Junichi Morimura et al., U.S. Appl. No. 16/167,883, filed Oct. 23, 2018.

Junichi Morimura et al., U.S. Appl. No. 16/847,910, filed Apr. 14, 2020.

Office Action dated Sep. 2, 2022 by the U.S. Patent and Trademark Office in U.S. Appl. No. 16/847,910.

Office Action from the U.S. Patent & Trademark Office dated Apr. 13, 2022 in U.S. Appl. No. 16/847,910.

Mercedes Benz, "F015 Luxury in Motion", printed from https://www.mercedes-benz.com/en/innovation/autonomous/research-vehicle-f-015-luxury-in-motion, 2022, 5 pages total.

Office Action dated Jul. 18, 2022 in U.S. Appl. No. 16/847,910.

Suzuki et al. , "Sensor Fusion-Based Pedestrian Collision Warning System with Crosswalk Detection", 2010 IEEE Intelligent Vehicles Symposium, University of California, San Diego, CA, USA, Jun. 21-24, 2010 (6 pages total).

(56) References Cited

OTHER PUBLICATIONS

Navarro et al., "A Machine Learning Approach to Pedestrian Detection for Autonomous Vehicles Using High-Definition 3D Range Data", Sensors 2017, vol. 17, No. 18, Dec. 23, 2016 (20 pages total).

Notice of Allowance dated Dec. 27, 2022 in U.S. Appl. No. 16/847,910.

Khaled Shaaban et al., "Analysis of illegal pedestrian crossing behavior on a major divided arterial road", Transportation Research Part F: Traffic Psychology and Behaviour, vol. 54, Apr. 2018, pp. 124-137 (2 pages total) (Abstract Only).

* cited by examiner

FIG. 11A

WHETHER VEHICLE CAN ADVANCE

| | | | | | |
|---|---|---|---|---|---|
| | VEHICLE SIGNAL | GREEN | GREEN | RED | RED |
| | PEDESTRIAN SIGNAL | GREEN | RED | GREEN | RED |
| CROSSING STATE | CROSSING (BEFORE PATH OR OVER PATH OF VEHICLE) | X | X | X | X |
| | CROSSING COMPLETE (ON VEHICLE ROAD, BUT ALREADY PASS THROUGH PATH OF VEHICLE) | O | O | X | X |
| | CROSSING COMPLETE | O | O | X | X |

O : ADVANCE
X : NO ADVANCE (STOP)

FIG. 11B

WHETHER INFORMING OF SCHEDULED DEPARTURE TIME BY VEHICLE IS NEEDED

| | | | | | |
|---|---|---|---|---|---|
| | VEHICLE SIGNAL | GREEN | GREEN | RED | RED |
| | PEDESTRIAN SIGNAL | GREEN | RED | GREEN | RED |
| CROSSING STATE | CROSSING (BEFORE PATH OR OVER PATH OF VEHICLE) | O | O | O | X |
| | CROSSING COMPLETE (ON VEHICLE ROAD, BUT ALREADY PASS THROUGH PATH OF VEHICLE) | O | O | X | X |
| | CROSSING COMPLETE | X | X | X | X |

O : NEED TO INFORM
X : NO NEED TO INFORM

VEHICLE CONTROL DEVICE

INCORPORATION BY REFERENCE

This application is a continuation of U.S. application Ser. No. 16/847,910 filed Apr. 14, 2020, which is a continuation of U.S. application Ser. No. 16/167,883 filed Oct. 23, 2018 (now U.S. Pat. No. 10,657,822 issued May 19, 2020), which claims priority based on Japanese Patent Application No. 2017-216407 filed on Nov. 9, 2017. The entire disclosures of the prior applications are considered part of the disclosure of the accompanying continuation application, and are hereby incorporated by reference..

BACKGROUND

1. Technical Field

The disclosure relates to a vehicle control device.

2. Description of Related Art

In the related art, a person crossing assistance notification system disclosed in Japanese Unexamined Patent Application Publication No. 2013-149296 (JP 2013-149296 A) is known as a system configured to transmit an action schedule of a vehicle to a pedestrian who crosses a road. In the person crossing assistance notification system disclosed in JP 2013-149296 A, the transmission to a person in a vehicle advancing direction is performed by an electric lamp (pedestrian crossing signal display means) mounted on a roof of the vehicle. When the person can safely cross the road while the vehicle is stopped, the person crossing assistance notification system causes green light to light up to transmit the fact that the crossing is possible for the person. When the vehicle starts to travel within a certain time, the person crossing assistance notification system causes green light to blink to transmit the fact that the vehicle starts to travel within the certain time to the person. When the vehicle travels, that is, when the crossing of the road by the person is dangerous, the person crossing assistance notification system causes red light to light up to transmit the fact that the crossing of the road is dangerous to the person.

SUMMARY

In the person crossing assistance notification system disclosed in JP 2013-149296 A, when the vehicle starts to travel within the certain time, the blinking display of the green light is performed. However, the person in the vehicle advancing direction does not know a time before the vehicle starts to travel. Thus, there is a possibility that a crossing person feels uneasiness that the vehicle may depart before the crossing is completed. When the time before the vehicle starts to travel becomes long, there is also a possibility that an occupant of the vehicle feels annoying. In the following, at least one case of a case where crossing over a path of the vehicle is completed or a case where the crossing of the entire width of the road is completed is simply referred to as "crossing completion".

An aspect of the disclosure relates to a vehicle control device including an external situation recognition unit, a scheduled departure time deciding unit, and an informing controller. The external situation recognition unit is configured to recognize a crossing person who crosses over a path of a vehicle and acquire information on the crossing person and information on an environment where the crossing person crosses. The scheduled departure time deciding unit is configured to decide a scheduled departure time of the vehicle based on the information on the crossing person and the environment where the crossing person crosses when the crossing person is recognized by the external situation recognition unit. The informing controller is configured to perform a control to inform an outside of the vehicle of the scheduled departure time decided by the scheduled departure time deciding unit. The scheduled departure time deciding unit predicts a crossing completion time at which the crossing person recognized by the external situation recognition unit completes the crossing and decides the scheduled departure time based on the crossing completion time.

In the aspect of the disclosure, when the crossing person who crosses over the path of the vehicle is recognized, the scheduled departure time of the vehicle is acquired and the crossing person is informed while the vehicle is stopped. At the time, the time at which the crossing person completes the crossing is predicted, the scheduled departure time of the vehicle is decided, and then it is possible for the crossing person to recognize the scheduled departure time.

In the vehicle control device according to the aspect of the disclosure, the external situation recognition unit may acquire a speed of the crossing person as the information on the crossing person. The scheduled departure time deciding unit may predict a crossing completion time based on the speed acquired by the external situation recognition unit.

In the aspect of the disclosure, it is possible to predict an appropriate crossing completion time according to the speed of the crossing person.

In the vehicle control device according to the aspect of the disclosure, the scheduled departure time deciding unit may predict a crossing completion time based on the information on the environment recognized by the external situation recognition unit.

In the aspect of the disclosure, it is possible to predict an appropriate crossing completion time even for a different road environment by recognizing the environment information including information such as a width of a road where the crossing person crosses, the number of lanes, and a width of the lane and predicting a crossing completion time based on the recognized environment information.

In the vehicle control device according to the aspect of the disclosure, the external situation recognition unit may recognize information relating to a width of a road on which the vehicle travels as a surrounding environment. The scheduled departure time deciding unit may predict a crossing completion time based on the width of the road.

The vehicle control device according to the aspect of the disclosure may further include a signal recognition unit configured to recognize a traffic signal on a road around the path of the vehicle and a signal switching time acquisition unit configured to acquire a signal switching time until a signal of the traffic signal switches. When a traffic signal is recognized by the signal recognition unit, a signal switching time is acquired by the signal switching time acquisition unit, and the signal switching time is longer than the crossing completion time, the scheduled departure time deciding unit may decide the scheduled departure time based on the signal switching time.

In the aspect of the disclosure, when there is a traffic signal in a place where a pedestrian crosses, it is possible to decide an appropriate scheduled departure time with respect to a time when a signal is switched. As described above, it is possible to prevent the crossing person from being informed of different information between the traffic signal and the vehicle.

In the vehicle control device according to the aspect of the disclosure, the informing controller may perform a control to display the informing of the scheduled departure time on a road surface between the vehicle and the crossing person.

In the vehicle control device according to the aspect of the disclosure, the informing controller may perform a control to inform the outside of the vehicle of information indicating a position of the vehicle and the scheduled departure time.

In the aspect of the disclosure, it is possible for the crossing person to easily recognize informing contents provided from the vehicle and a position relationship between the vehicle and the crossing person.

According to the aspects of the disclosure, it is possible to provide a vehicle capable of informing the crossing person of the scheduled departure time of the vehicle to suppress uneasiness of the crossing person.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 11A is a table showing an example of a relationship between vehicle signal information, a pedestrian signal, a crossing state of the crossing person, and whether the vehicle can advance;

FIG. 11B is a table showing an example of a relationship between the vehicle signal information, the pedestrian signal, the crossing state of the crossing person, and whether informing of a scheduled departure time by the vehicle is needed;

DETAILED DESCRIPTION OF EMBODIMENTS

Figure 1:
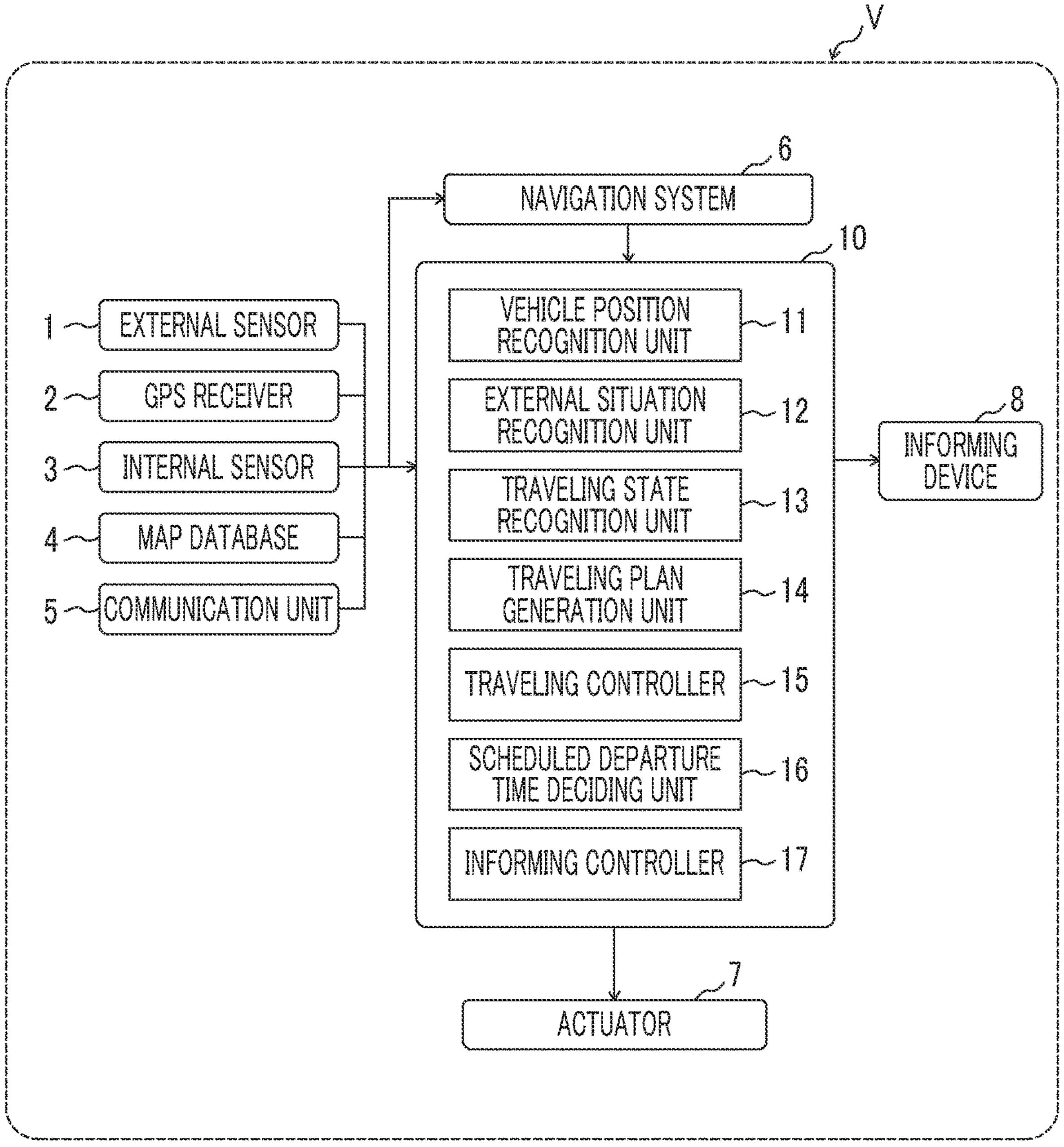
FIG. 1 is a block diagram showing a configuration of a vehicle on which a vehicle control device is mounted according to a first embodiment.

Hereinafter, embodiments of the disclosure will be described with reference to drawings. In the following description, the same reference numeral will be assigned to the same or equivalent element, and a redundant description will be omitted.

First Embodiment

Figure 2:
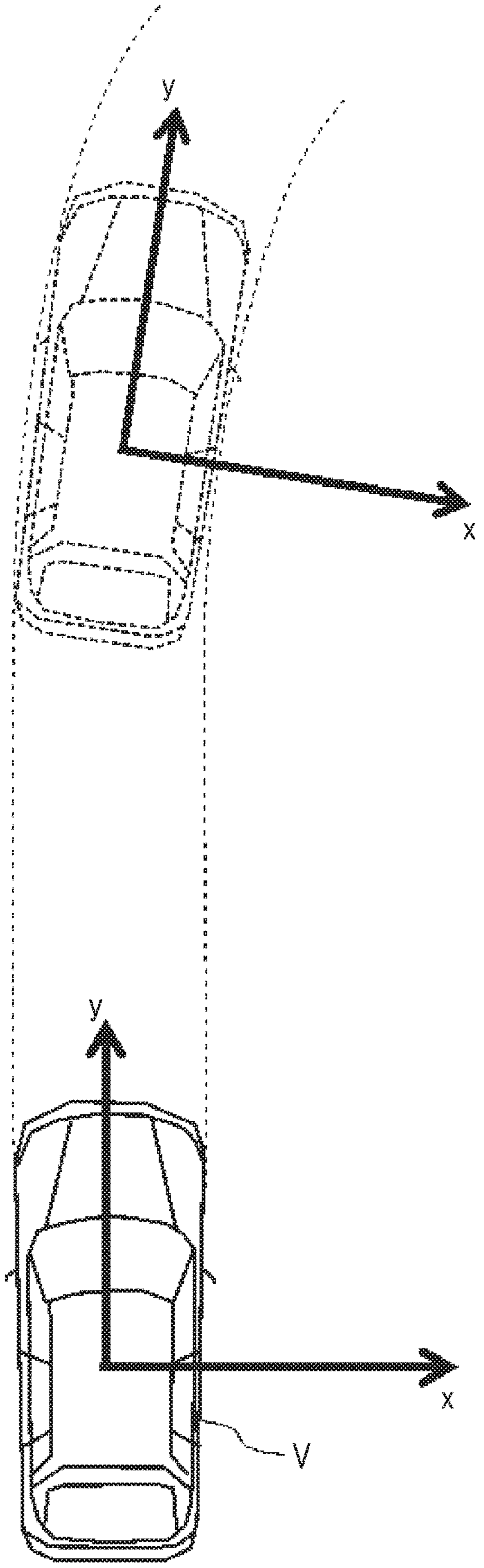
FIG. 2 is an overhead view for describing a coordinate used when a crossing completion time of a crossing person is calculated.

FIG. 1 is a block diagram showing a configuration of a vehicle V on which a vehicle control device 10 is mounted according to a first embodiment. As shown in FIG. 1, the vehicle control device 10 is mounted on the vehicle V. FIG. 2 is an overhead view for describing an operation of the vehicle V according to the first embodiment.

The vehicle V includes an external sensor 1, a global positioning system (GPS) receiver 2, an internal sensor 3, a map database 4, a communication unit 5, a navigation system 6, an actuator 7, an informing device 8, and a vehicle control device 10.

The external sensor 1 is a detector configured to detect environment information (external situation) around the vehicle V. The external sensor 1 includes at least one of a camera or a radar sensor. The camera is an imaging apparatus configured to image a surrounding environment. The camera is provided, for example, on the back side of a windshield of the vehicle V. The camera transmits imaging information to the vehicle control device 10. The camera may be a monocular camera or a stereo camera. The stereo camera has two imaging units disposed so as to reproduce binocular parallax. The imaging information of the stereo camera also includes information in the depth direction. The radar sensor is the detector configured to detect an object around the vehicle V using a radio wave (for example, millimeter wave) or light. The radar sensor includes, for example, a millimeter wave radar or a laser imaging detection and ranging (LIDAR). The radar sensor transmits a radio wave or light to the periphery of the vehicle V and receives the radio wave or the light reflected from the object to detect the object. The radar sensor transmits object information to the vehicle control device 10. The mounted number of respective cameras or radar sensors and a mounted position thereof are not particularly limited.

The informing device 8 is an apparatus capable of informing that may be recognized from the outside of the vehicle V. Examples of the informing device 8 may be a direction indicator, headlight, a wiper, a speaker, or a display. The informing device 8 may have a projector function capable of projecting informing contents on a road surface outside the vehicle or the like or a function of scanning and irradiating a visible light laser, and may display a visible character, a numeral, or the like on the road.

The GPS receiver 2 is mounted on the vehicle V and functions as a position measurement unit configured to measure a position of the vehicle V. The GPS receiver 2 receives signals from three or more GPS satellites to measure the position (for example, latitude and longitude of the vehicle V) of the vehicle V. The GPS receiver 2 transmits the measured position information of the vehicle V to the vehicle control device 10.

The internal sensor 3 is a detector configured to detect a vehicle state of the vehicle V. The internal sensor 3 includes a vehicle speed sensor, an acceleration sensor, and a yaw rate sensor. The vehicle speed sensor is the detector configured to detect a vehicle speed of the vehicle V. A wheel speed sensor that is provided in a wheel, a drive shaft configured to rotate integrally with the wheels, or the like of the vehicle V and is configured to detect a rotational speed of the wheel is used as the vehicle speed sensor. The vehicle speed sensor transmits the detected vehicle speed information to the vehicle control device 10.

The internal sensor 3 may include a steering angle sensor. The steering angle sensor is the detector configured to detect a steering angle (actual steering angle) of the vehicle V. The steering angle sensor is provided in a steering shaft of the vehicle V. The steering angle sensor transmits the detected steering angle information to the vehicle control device 10.

The acceleration sensor is the detector configured to detect acceleration of the vehicle V. The acceleration sensor includes a front-rear acceleration sensor configured to detect the acceleration of the vehicle V in the front-rear direction and a lateral acceleration sensor configured to detect the lateral acceleration of the vehicle V. The acceleration sensor transmits acceleration information of the vehicle V to the vehicle control device 10. The yaw rate sensor is the detector configured to detect a yaw rate (rotational angular velocity) around a vertical axis of the center of gravity of the vehicle V. A gyro sensor may be used as the yaw rate sensor. The yaw rate sensor transmits the detected yaw rate information of the vehicle V to the vehicle control device 10.

The map database 4 is a database configured to store map information. The map information may include position information on a fixed obstacle. The map information may include position information on a white line provided on the road. The map database 4 is stored in a hard disk drive (HDD) mounted on the vehicle V. The map database 4 may be connected to a server of a map information management center by wireless communication and periodically update the map information using the latest map information stored in the server of the map information management center. The map database 4 is not always needed to be mounted on the vehicle V. The map database 4 may be provided in a server or the like capable of communicating with the vehicle V.

The map database 4 may store information relating to a traffic rule such as a vehicle stop line, a crossing walk zone, a traffic signal, and regulation speed information.

The navigation system 6 is mounted on the vehicle V and sets a target route on which the vehicle V travels by an autonomous driving control. The navigation system 6 calculates the target route from a position of the vehicle V to a destination based on the destination set in advance, the position of the vehicle V measured by the GPS receiver 2, and the map information of the map database 4. The occupant of the vehicle V operates an input button (or touch panel) included in the navigation system 6 to set the destination. The navigation system 6 can set the target route using a known method. The navigation system 6 may have a function of performing guidance along the target route at a time of manual driving of the vehicle V by a driver. The navigation system 6 transmits information on the target route of the vehicle V to the vehicle control device 10. Some functions of the navigation system 6 may be executed by a server of a facility such as an information processing center capable of communicating with the vehicle V. The functions of the navigation system 6 may be executed by the vehicle control device 10.

The target route herein includes a target route generated automatically based on a history of the past destinations or the map information when the setting of the destination is not clearly performed by the driver.

The actuator 7 is a device configured to execute a traveling control of the vehicle V. The actuator 7 includes at least an engine actuator, a brake actuator, and a steering actuator. The engine actuator controls a supply amount (throttle opening degree) of the air to an engine according to a control signal from the vehicle control device 10 to control driving force of the vehicle V. When the vehicle V is a hybrid vehicle, the control signal from the vehicle control device 10 is input to a motor as a power source to the engine to control the driving force, in addition to the supply amount of the air. When the vehicle V is an electric vehicle, the control signal from the vehicle control device 10 is input to the motor as the power source to control the driving force.

The brake actuator controls a brake system according to the control signal from the vehicle control device 10 to control braking force assigned to the wheels of the vehicle V. A hydraulic brake system may be used as the brake system. The steering actuator controls driving of an assist motor configured to control steering torque in an electric power steering system according to the control signal from the vehicle control device 10. As described above, the steering actuator controls the steering torque of the vehicle V.

The communication unit 5 transmits and receives information by communication with the outside of the vehicle V. Examples of the information received by the communication unit 5 may be local or wide area traffic information distributed from an external center, traveling information of another vehicle transmitted from the other vehicle, and a sensor detection result.

The vehicle control device 10 is an electronic control unit having a central processing unit (CPU), a read only memory (ROM), a random access memory (RAM), a controller area network (CAN) communication circuit, and the like. The vehicle control device 10 is connected to, for example, a network configured to communicate using the CAN communication circuit and is connected to the external sensor 1, the GPS receiver 2, the internal sensor 3, the map database 4, the communication unit 5, the navigation system 6, the actuator 7, and the informing device 8 in a communicable manner. For example, the vehicle control device 10 operates the CAN communication circuit to input and output data based on a signal output by the CPU, stores the input data in the RAM, loads a program stored in the ROM into the RAM, and executes the program loaded into the RAM to realize the functions of constituents of the vehicle control device 10. The vehicle control device 10 may be configured of a plurality of electronic control units. The vehicle control device 10 includes a vehicle position recognition unit 11, an external situation recognition unit 12, a traveling state recognition unit 13, a traveling plan generation unit 14, a traveling controller 15, a scheduled departure time deciding unit 16, and an informing controller 17, as a functional configuration.

The vehicle position recognition unit 11 recognizes a position of the vehicle V on the map based on the position information of the GPS receiver 2 and the map information of the map database 4. The vehicle position recognition unit 11 may recognize the position of the vehicle V by a conventional simultaneous localization and mapping (SLAM) technique using the position information of the fixed obstacle such as a utility pole included in the map information of the map database 4 and a detection result of the external sensor 1.

The external situation recognition unit 12 recognizes an external situation of the vehicle V based on the detection result of the external sensor 1. The external situation recognition unit 12 recognizes the external situation of the vehicle V including a position of an obstacle around the vehicle V by a known method based on at least one of a captured image of the camera or obstacle information of the radar sensor. A timing when the external situation recognition unit 12 recognizes the external situation of the vehicle V may be while the vehicle V travels or while the vehicle V is stopped.

The external situation recognition unit 12 distinguishes between a crossing person and an obstacle other than the crossing person and recognizes the crossing person and the obstacle. A position of the crossing person with respect to the vehicle V, a movement direction of the crossing person with respect to the vehicle V, and a relative speed of the crossing person with respect to the vehicle V are acquired as pieces of information relating to the recognized crossing person.

The crossing person includes not only the pedestrian but also a person who rides in various types of vehicles such as a baby stroller, a wheelchair, a bicycle, and a personal mobility that can pass a sidewalk. The external situation recognition unit 12 may determine whether the recognized crossing person is scheduled to cross over a path of the vehicle based on at least one of the position of the crossing person with respect to the vehicle V, the movement direction of the crossing person with respect to the vehicle V, or the relative speed of the crossing person with respect to the vehicle V and a traveling plan generated by the traveling plan generation unit 14 described below.

The traveling state recognition unit 13 recognizes a traveling state of the vehicle V including the vehicle speed and an orientation of the vehicle V based on the detection result of the internal sensor 3. Specifically, the traveling state recognition unit 13 recognizes the vehicle speed of the vehicle V based on the vehicle speed information of the vehicle speed sensor. The traveling state recognition unit 13 recognizes the orientation of the vehicle V based on yaw rate information of the yaw rate sensor.

The traveling plan generation unit 14 generates the traveling plan of the vehicle V based on the target route set by the navigation system 6, the map information of the map database 4, the external situation of the vehicle V recognized by the external situation recognition unit 12, and the traveling state of the vehicle V recognized by the traveling state recognition unit 13. The traveling plan is a traveling plan for heading from a current position of the vehicle V to the destination set in advance.

The traveling plan includes a control target value of the vehicle V according to a position of the vehicle V on the target route. The position on the target route is a position in the extending direction of the target route on the map. The position on the target route means a target longitudinal position set for each predetermined spacing (for example, 1 meter) in the extending direction of the target route. The control target value is a value that is a control target of the vehicle V in the traveling plan. The control target value is set in association with each target longitudinal position on the target route. The traveling plan generation unit 14 sets the target longitudinal position of the predetermined spacing on the target route and sets the control target value (for example, target lateral position and target vehicle speed) for each target longitudinal position to generate the traveling plan. The target longitudinal position and the target lateral position may be set together as one position coordinate. The target longitudinal position and the target lateral position mean information of a longitudinal position and information of a lateral position set as targets in the traveling plan.

For example, the traveling plan generation unit 14 performs the recognition based on time series data of the detection result of the external sensor 1 and the recognition by pattern matching with respect to the detection result of the external sensor 1 to generate the traveling plan of the vehicle V such that a moving obstacle does not interfere with the vehicle V when the moving obstacle is recognized by the external situation recognition unit 12. In the case, the traveling plan may be generated such that the target vehicle speed of the vehicle V is reduced around the moving obstacle or the vehicle V is stopped (that is, such that the target vehicle speed becomes zero) around the moving obstacle.

When an execution start operation of the autonomous driving control is input by the occupant, the traveling controller 15 executes the autonomous driving control. The traveling controller 15 may execute the autonomous driving control when a predetermined condition is satisfied. The traveling controller 15 executes the autonomous driving control including the speed control and the steering control of the vehicle V based on the position of the vehicle V on the map recognized by the vehicle position recognition unit 11 and the traveling plan generated by the traveling plan generation unit 14. Here, the traveling plan is a traveling plan for heading to the destination set in advance, the traveling plan being generated by the traveling plan generation unit 14. The traveling controller 15 transmits the control signal to the actuator 7 to execute the autonomous driving control. The driving state of the vehicle V becomes an autonomous driving state due to the execution of the autonomous driving control by traveling controller 15.

When the crossing person recognized by the external situation recognition unit 12 crosses over the path of the vehicle obtained from the traveling plan of the vehicle acquired from the traveling plan generated by the traveling plan generation unit 14, the scheduled departure time deciding unit 16 calculates a time at which the crossing person completes the crossing based on the position of the crossing person with respect to the vehicle V, the movement direction of the crossing person with respect to the vehicle V, and the relative speed of the crossing person with respect to the vehicle V. The path means a space or a position where the vehicle is scheduled to advance from now. For example, the path may be acquired from the traveling plan of the vehicle or the target route of the navigation system 6 in a case of an autonomous driving vehicle, and acquired by estimating from the target route of the navigation system 6, a driving operation (turn signal operation and steering angle) by the driver, and detection information of a face direction and line of sight of the driver in a case of a manual driving vehicle. A scheduled departure time is a time or a time point when the vehicle is scheduled to depart. The scheduled departure time deciding unit 16 decides the scheduled departure time of the vehicle V based on a time requested for the crossing person to cross over the path of the vehicle. The scheduled departure time of the vehicle V is after the crossing person completes the crossing over the path of the vehicle. When there is a plurality of crossing persons who cross over the path of the vehicle V, the scheduled departure time of the vehicle V is after the time at which the last crossing person completes the crossing.

Here, the scheduled departure time deciding unit 16 may calculate the time at which the crossing person completes the crossing based on the map information of the map database 4 or environment information around the crossing person recognized by the external situation recognition unit 12. In the case, after a width of a road where the crossing person crosses, the number of lanes, and a weather state are acquired based on the map information or the information acquired from the external situation recognition unit 12, and the acquired information is collated with information in a past case, the time at which the crossing person completes the crossing may be estimated.

The scheduled departure time deciding unit 16 may acquire road width information relating to a road width of the road where the vehicle V travels from the map information of the map database 4 and calculate the time at which the crossing person completes the crossing of the road based on the acquired road width information and a position of the crossing person. The scheduled departure time deciding unit 16 may acquire information of the number of lanes of the road in addition to the road width and calculate the time at which the crossing person completes the crossing based on the acquired information.

The scheduled departure time deciding unit 16 may decide the scheduled departure time of the vehicle V based on a crossing completion time at which the crossing person completes the crossing of the entire width of the road or based on a crossing completion time at which the crossing person completes the crossing over the path by the traveling plan of the vehicle V. Here, whether the crossing completion time is set as the time at which the crossing person completes the crossing of the entire road or the time at which the crossing person completes the crossing over the path by the traveling plan of the vehicle V may be switched based on the width of the road width, the number of lanes of the road, a signal lighting state of surrounding traffic signal, presence or absence of a following vehicle or the number of following vehicles, or the like.

The scheduled departure time deciding unit 16 may decide the scheduled departure time after the vehicle V is stopped or without waiting the stop of the vehicle V at a time while the vehicle V travels.

The informing controller 17 controls the informing device 8 such that the informing device 8 informs the outside of the vehicle of the scheduled departure time or time point of the vehicle V decided by the scheduled departure time deciding unit 16. For example, the informing controller 17 controls the informing device 8 such that the informing device 8 displays the number of seconds remaining before the vehicle V departs as the scheduled departure time to the outside. In the case of the time point, the informing controller 17 controls the informing device 8 such that the informing device 8 displays the time point when the vehicle V is scheduled to depart to the outside.

When the informing device 8 is a visual informing device such as the display or a projector, the informing controller 17 may control the informing device 8 such that the informing device 8 displays the scheduled departure time at a position where the crossing person visually recognize. When the informing device 8 is a road surface projection device capable of visual informing on the road surface, the scheduled departure time may be displayed on a road surface between the vehicle V and the crossing person. When the scheduled departure time is projected and displayed to the outside of the vehicle V, a direction from a projection position to the vehicle V may be displayed at the same time.

FIG. 2 is an overhead view for describing a coordinate system used when an operation of the vehicle control device 10 is described. As shown in FIG. 2, the y-axis is a path direction of the vehicle V, and the x-axis is a width direction of the vehicle V that is perpendicular to the path direction.

Figure 3:
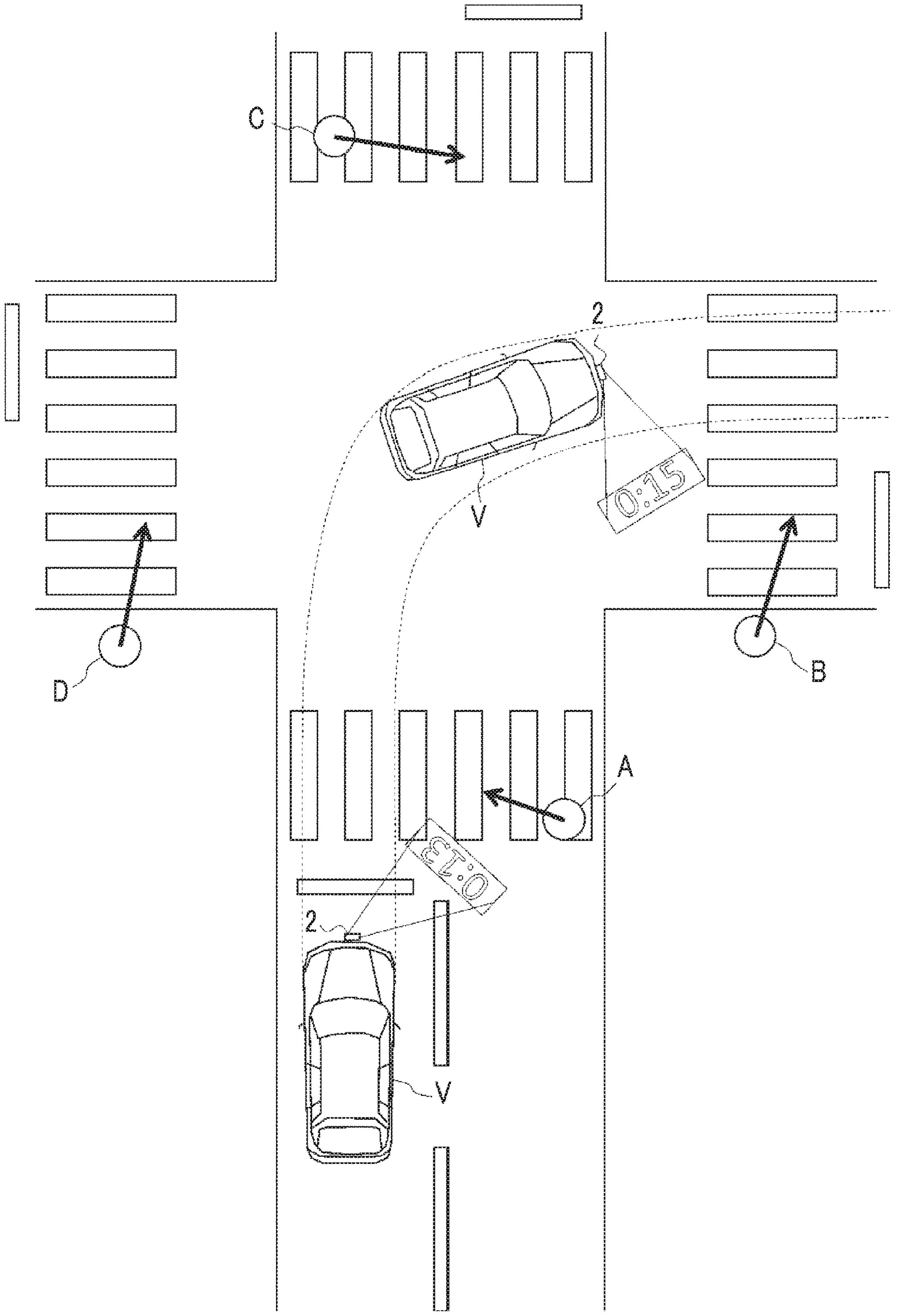
FIG. 3 is an overhead view for describing a series of pieces of processing executed by the vehicle control device according to the first embodiment at a time of a right turn of the vehicle.

FIG. 3 is an overhead view for describing an example of the operation of the vehicle control device 10. FIG. 3 shows the vehicle V stopped before a crosswalk, and a crossing person A and a crossing person B who cross crosswalks on the path obtained from the traveling plan of the vehicle V. In the example, the vehicle V passes through a crosswalk where the crossing person A crosses and then passes through a crosswalk where the crossing person B crosses. At this time, the vehicle V recognizes the crossing person A and the crossing person B by the external situation recognition unit 12 of the vehicle control device 10. The external situation recognition unit 12 acquires positions of the crossing person A and the crossing person B with respect to the vehicle V, movement directions of the crossing person A and the crossing person B with respect to the vehicle V, and relative speeds of the crossing person A and the crossing person B with respect to the vehicle V as pieces of information relating to the crossing persons.

In the example in FIG. 3, the informing controller 17 controls the informing device 8 based on the scheduled departure time decided by the scheduled departure time deciding unit 16. In FIG. 3, the scheduled departure times decided by the scheduled departure time deciding unit 16 are projected and displayed on the road surfaces between the crossing persons and the vehicle V by the informing device 8 having the projector function. In the example, the time displayed for the crossing person A is 0 minutes and 13 seconds remaining, and the time displayed for the crossing person B is 0 minutes and 15 seconds remaining. The times displayed for the crossing person A and the crossing person B are updated for each predetermined time interval before the times become 0 seconds remaining in a count-down mode. When the scheduled departure time is later, the scheduled departure time may be displayed as a time point.

The informing contents projected and displayed on the road surface may be appropriately adjusted such that a display direction coincides with a direction of a line that connects the position of the vehicle V and a current position of the crossing person so as to be visually recognized by the crossing person who crosses over the path of the vehicle V. A display position may be appropriately changed according to movement of the crossing person. The informing contents may be projected, for example, at a position separated from the current position of the crossing person by a predetermined distance (for example, 1 meter) in an advancing direction of the crossing person while the display position is made to follow the movement of the crossing person.

Figure 4:
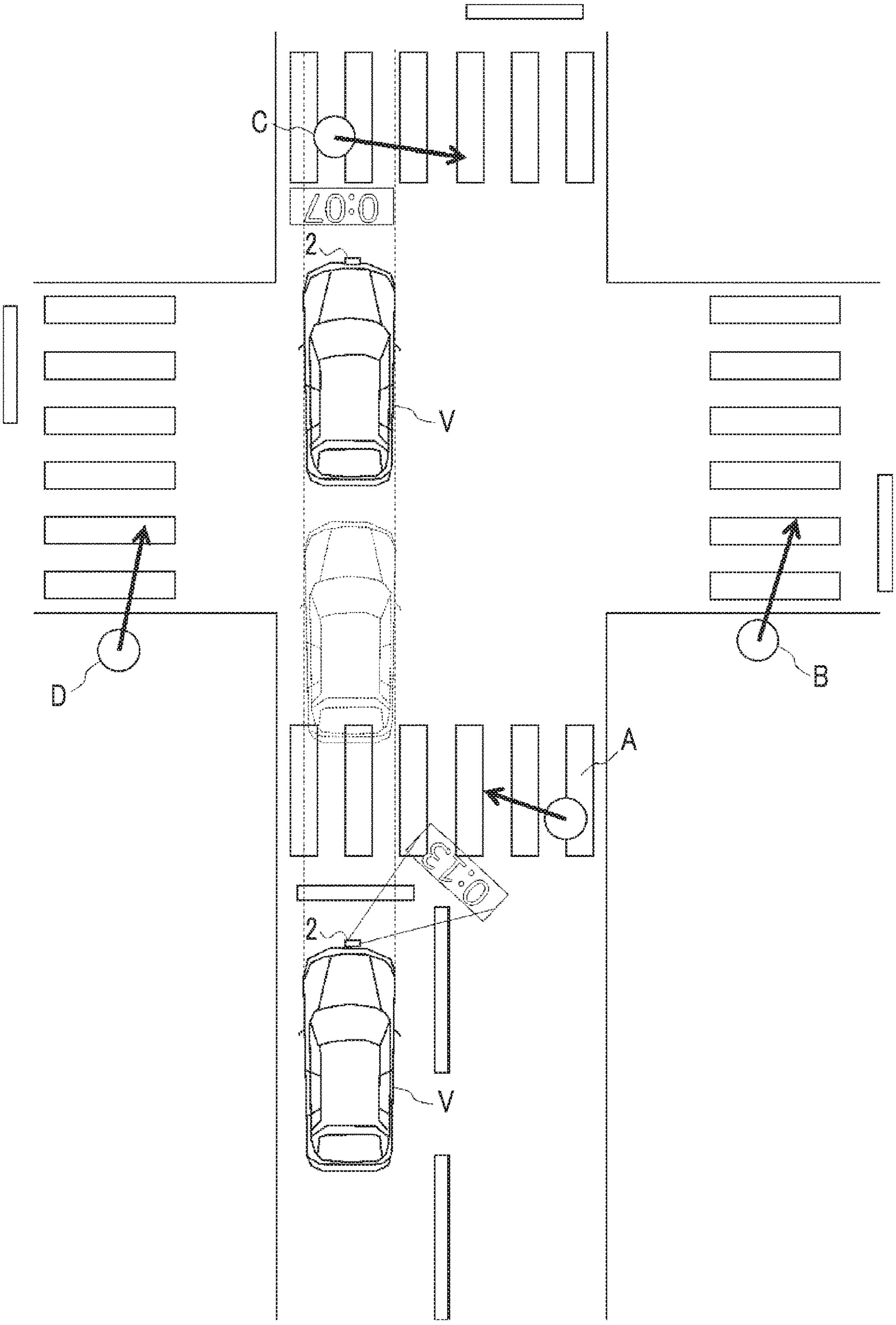
FIG. 4 is an overhead view for describing a series of pieces of processing executed by the vehicle control device according to the first embodiment at a time of straight traveling of the vehicle.

FIG. 4 is an overhead view for describing an example of the operation of the vehicle control device 10 in the same as in FIG. 3. FIG. 4 shows the vehicle V stopped before the crosswalk and the crossing person A and a crossing person C who cross crosswalks on the path of the vehicle V that is scheduled to travel straight on the traveling plan. In the example, the vehicle V passes through the crosswalk where the crossing person A crosses, and then the vehicle V departs. The vehicle V stops again before a crosswalk where the crossing person C crosses, and then the vehicle V passes through the crosswalk after the crossing completion of the crossing person C.

Figure 5:
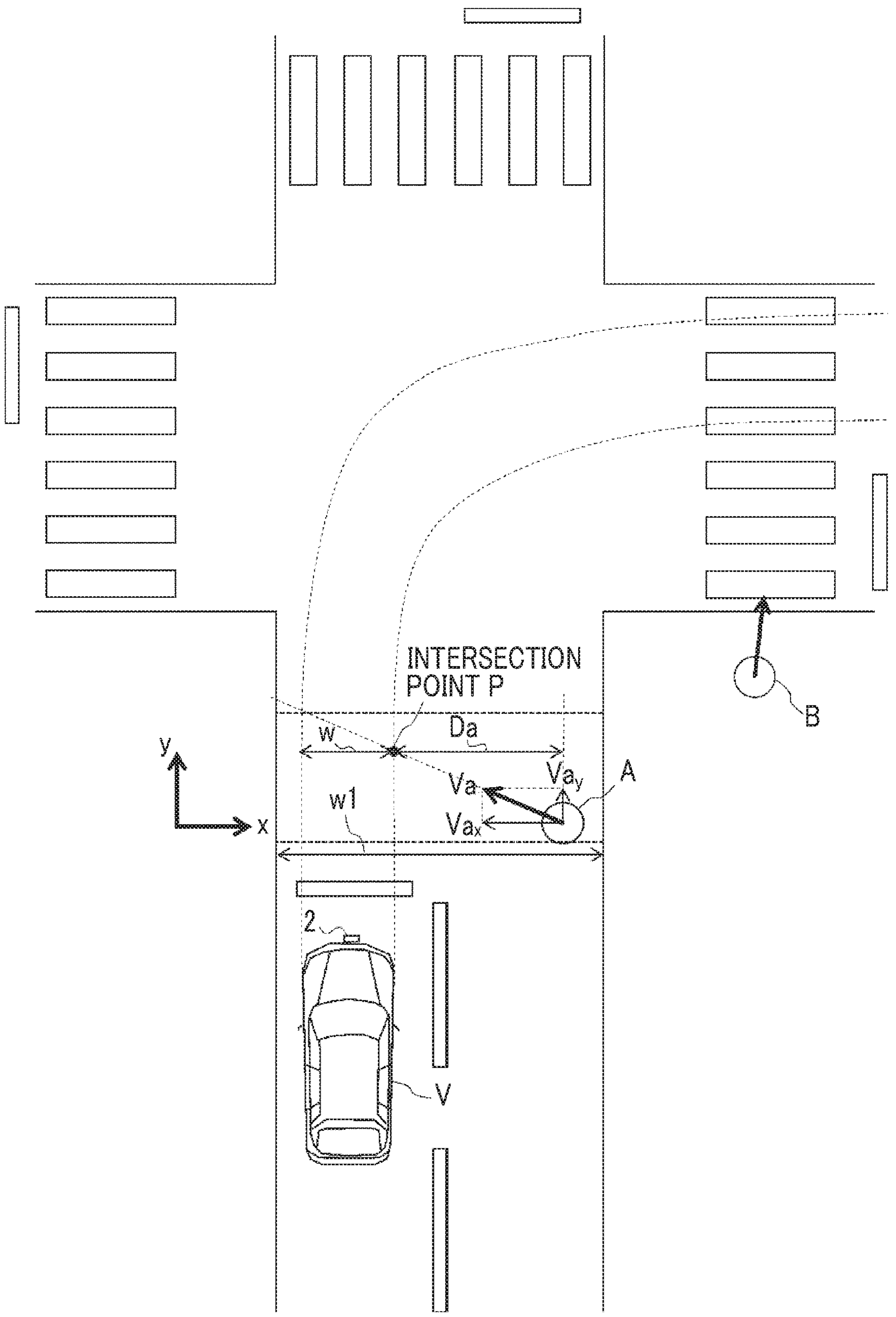
FIG. 5 is an overhead view for describing a calculation method of a crossing completion time of the crossing person by the vehicle control device according to the first embodiment before the right turn of the vehicle.
Figure 6:
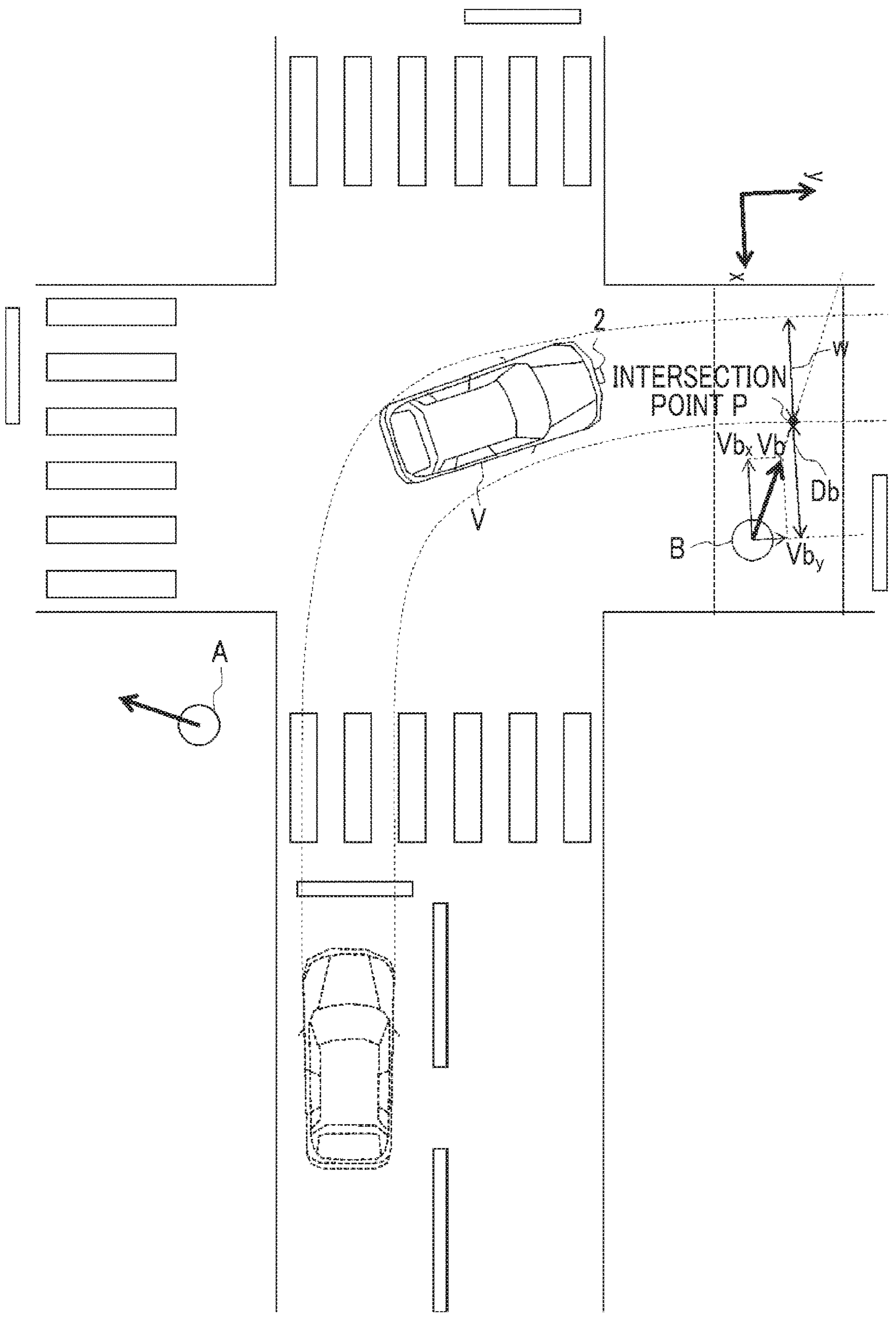
FIG. 6 is an overhead view for describing a calculation method of a crossing completion time of the crossing person by the vehicle control device according to the first embodiment at the time of the right turn of the vehicle.

FIGS. 5 and 6 are overhead views for describing examples of an operation of the scheduled departure time deciding unit 16 of the vehicle control device 10 and are overhead views representing the same situation as in FIG. 3. The vehicle V has a vehicle width w and temporarily stops before places where the crossing persons A, B cross over the path of the vehicle V. Road widths of the roads where the crossing persons A, B cross are w1. The crossing person A crosses over the path of the vehicle V from the right side to the left side of the vehicle V with a speed Va (x-axis component is $Va_x$) at a position separated from a right side end portion of the vehicle V by Da in the vehicle width direction. The crossing person B crosses over the path of the vehicle V from the right side to the left side of the vehicle V with a speed Vb (x-axis component is $Vb_x$) at a position separated from the right side end portion of the vehicle V by Db in the vehicle width direction. The scheduled departure time deciding unit 16 calculates a time tA requested for the crossing person A to complete the crossing over the path of the vehicle and a time tB requested for the crossing person B to complete the crossing over the path of the vehicle.

A time ti requested for a crossing person i who crosses the road on the traveling plan to complete the crossing over the path of the vehicle with a vehicle width direction speed component Vix at a position separated from an intersection point P between a side end portion on a crossing person side of the vehicle V on the path of the vehicle V and an extended line in the advancing direction of the crossing person i by Di in the vehicle width direction (x-axis direction) is calculated by the following equation (1).

$$ti=(Di+w)/Vix \qquad (1)$$

Figure 7:
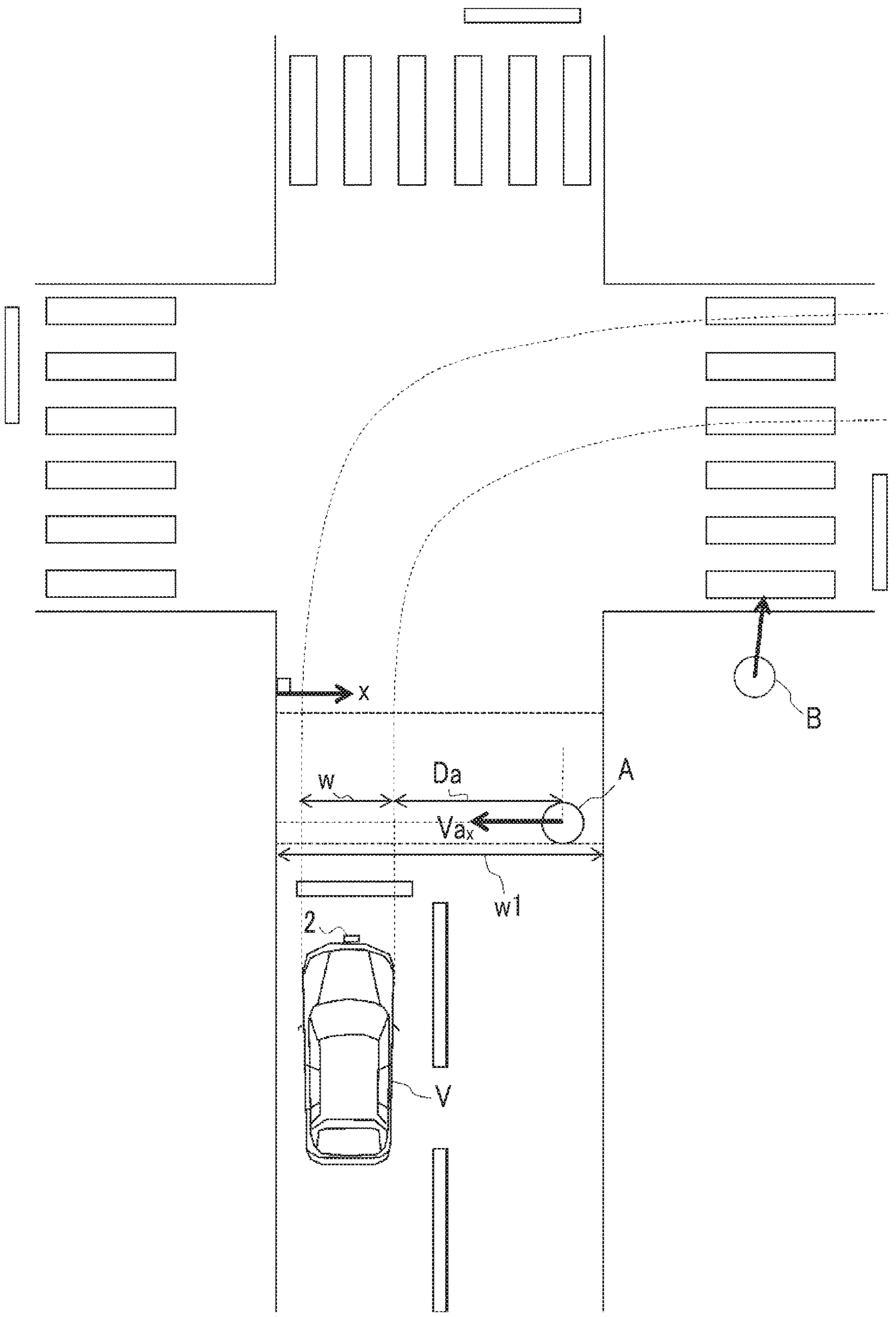
FIG. 7 is an overhead view for describing a modification example of the calculation method of the crossing completion time of the crossing person by the vehicle control device according to the first embodiment before the right turn of the vehicle.

FIG. 7 is an overhead view for describing a modification example of the operation by the scheduled departure time deciding unit 16 described above. Here, the crossing completion time may be obtained by equation (1) by setting a direction perpendicular to an extension direction of the road while the vehicle V travels as the x-axis, obtaining an intersection point between an extended line extending from the crossing person A in the x-axis direction and the side end portion on the crossing person side of the vehicle V on the path of the vehicle V, and setting a distance between the obtained intersection point and a position of the crossing person A as Di.

The scheduled departure time deciding unit 16 decides the scheduled departure time based on the longest time (t_max) among times ti requested for completing the crossing over the path of the vehicle, the times being calculated for respective crossing persons i. For example, the scheduled departure time is decided after t_max from a current time. The scheduled departure time may be decided after t_max and a predetermined time C (that is, after t_max+C) from the current time.

In the above description, the examples of the operation of the vehicle control device 10 are described with reference to FIGS. 3 to 7. However, the scheduled departure time may be decided based on, for example, a time (w1/Vix) requested for the crossing person i to cross the road width w1 of the road.

In the first embodiment, processing executed by the vehicle control device 10 will be described in detail with reference to a flowchart of FIG. 8.

Figure 8:
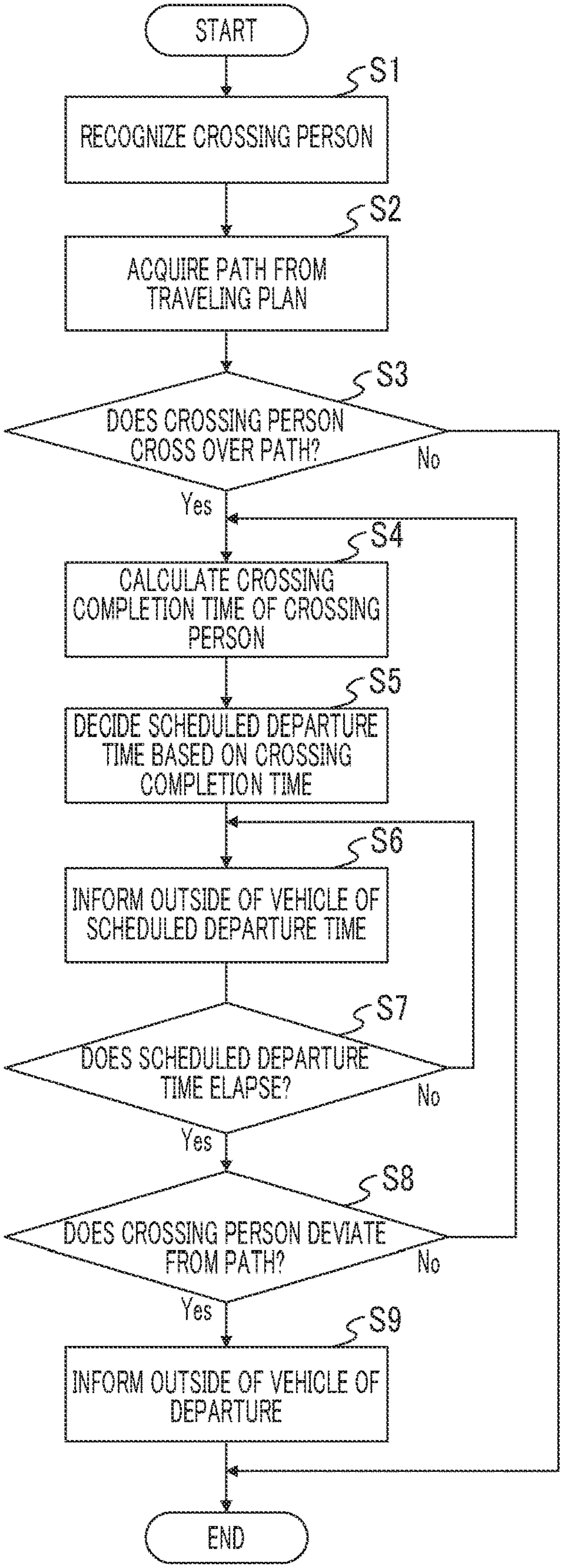
FIG. 8 is a part of a flowchart showing a series of pieces of processing by the vehicle control device according to the first embodiment.

FIG. 8 is the flowchart showing the processing of the vehicle control device 10. The flowchart exemplified herein is not repeatedly executed for each predetermined time. For example, the flowchart is executed every time the crosswalk or an intersection is in the vicinity.

The external situation recognition unit 12 recognizes a crossing person presenting around a path (S1). The path of the vehicle V is acquired from a traveling plan generated by the traveling plan generation unit 14 (S2). Determination is made whether the recognized crossing person is scheduled to cross over the path of the vehicle based on at least one of the position of the crossing person with respect to the vehicle V, the movement direction of the crossing person with respect to the vehicle V, or the relative speed of the crossing person with respect to the vehicle V (S3).

When determination is made that the crossing person recognized by the external situation recognition unit 12 is not scheduled to cross over the path of the vehicle (S3: No), the processing ends.

On the other hand, when determination is made that the crossing person recognized by the external situation recognition unit 12 is scheduled to cross over the path of the vehicle (S3: Yes), the scheduled departure time deciding unit 16 calculates a time requested for the crossing person to complete the crossing (S4). The scheduled departure time deciding unit 16 decides the scheduled departure time of the vehicle V based on the calculated crossing completion time of the crossing person (S5). The informing controller 17 controls the informing device 8 such that the informing device 8 informs the outside of the vehicle of the scheduled departure time decided by the scheduled departure time deciding unit 16 (S6).

After step S6, the vehicle control device 10 proceeds to the processing of step S7. In step S7, determination is made whether the scheduled departure time informed in step S6 elapses. When the scheduled departure time elapses, the processing proceeds to step S8 (S7: Yes). When the scheduled departure time does not elapse, step S6 is repeated (S7: No).

In step S8, when the crossing person does not deviate from the path of the vehicle V (when the crossing person does not complete the crossing over the path), the processing from step S4 is repeated (S8: No). In step S8, when the crossing person deviates from the path of the vehicle V, the processing proceeds to step S9 (S8: Yes). In step S9, the processing of informing the outside of the vehicle that the vehicle V departs is performed (S9).

When the crossing person who crosses over the path of the vehicle V is recognized, the vehicle control device 10 according to the embodiment calculates the time requested for the crossing person to cross over the path, decides the scheduled departure time of the vehicle based on the calculated time, and informs the crossing person of the decided scheduled departure time. Therefore, it is possible for the crossing person to recognize the time before the vehicle departs.

In the above description, the first embodiment is described, but the disclosure may be implemented without being limited to the embodiment. For example, in the series of pieces of processing described with reference to FIG. 8, a control may be performed that the informing of step S6 is ended after the scheduled departure time elapses, no obstacles including the crossing person on the path of the vehicle is confirmed, and then the vehicle V departs, without performing the pieces of processing of steps S7, S8.

Figure 9:
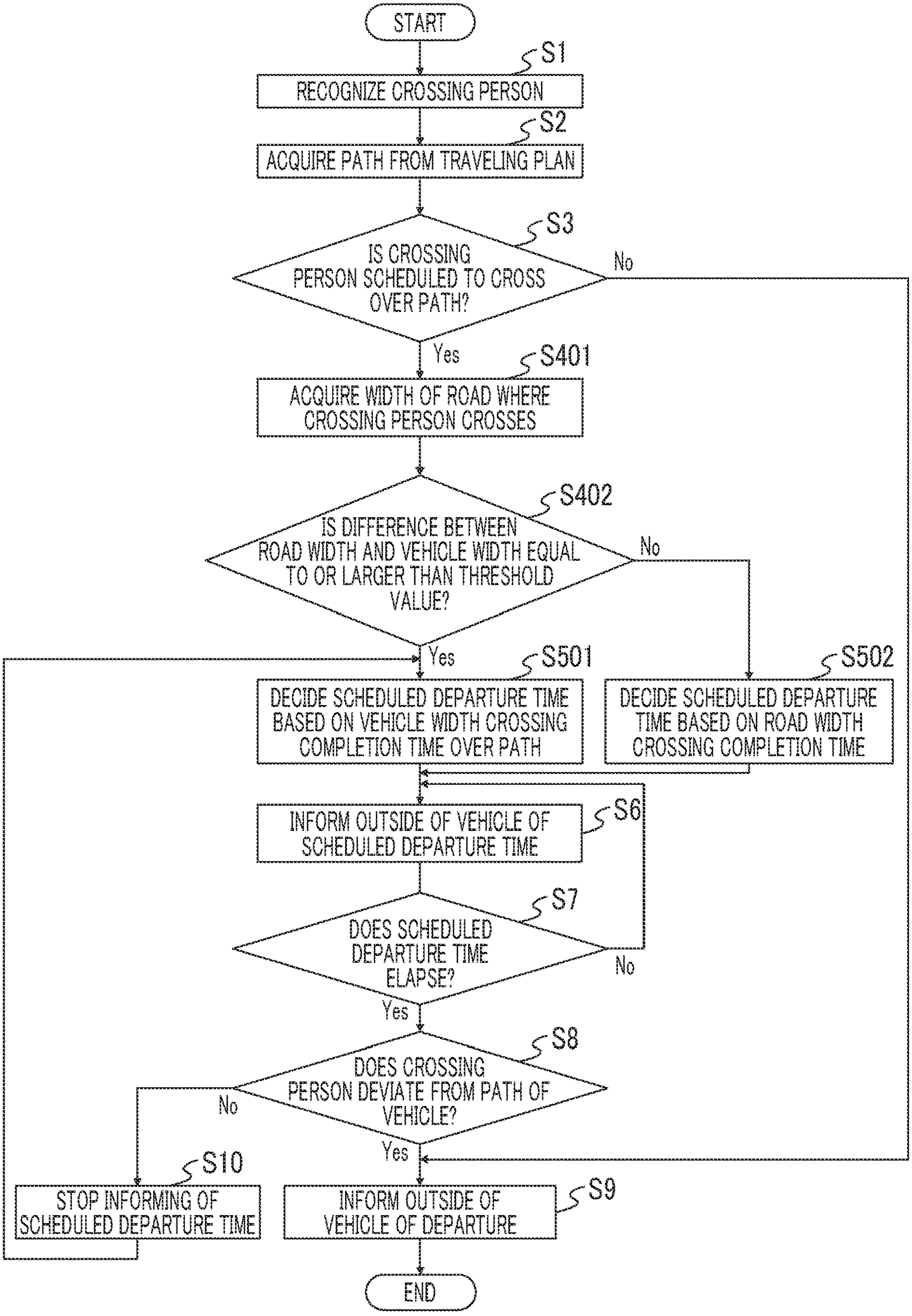
FIG. 9 is a part of a flowchart showing a series of pieces of processing by the vehicle control device according to a modification example of the first embodiment.

As a modification example of the embodiment, for example, pieces of processing shown in FIG. 9 may be employed. In FIG. 9, when the crossing person crosses over the path of the vehicle V on the road on the target route of the vehicle V, a difference between the width of the road and the vehicle width of the vehicle V is compared with a threshold value (S402). In S402, when the difference between the width of the road and the vehicle width of the vehicle V is equal to or larger than the threshold value, a vehicle width crossing completion time of the crossing person is calculated using the vehicle width w of the vehicle V, and the scheduled departure time is decided based on the vehicle width crossing completion time (S501). On the other hand, in S402, when the difference between the width of the road and the vehicle width of the vehicle V is less than the threshold value, a road width crossing completion time of the crossing person is calculated using the width w1 of the road, and the scheduled departure time may be decided based on the road width crossing completion time.

Second Embodiment

A second embodiment will be described. In the description of the embodiment, points different from the first embodiment will be described.

Figure 10:
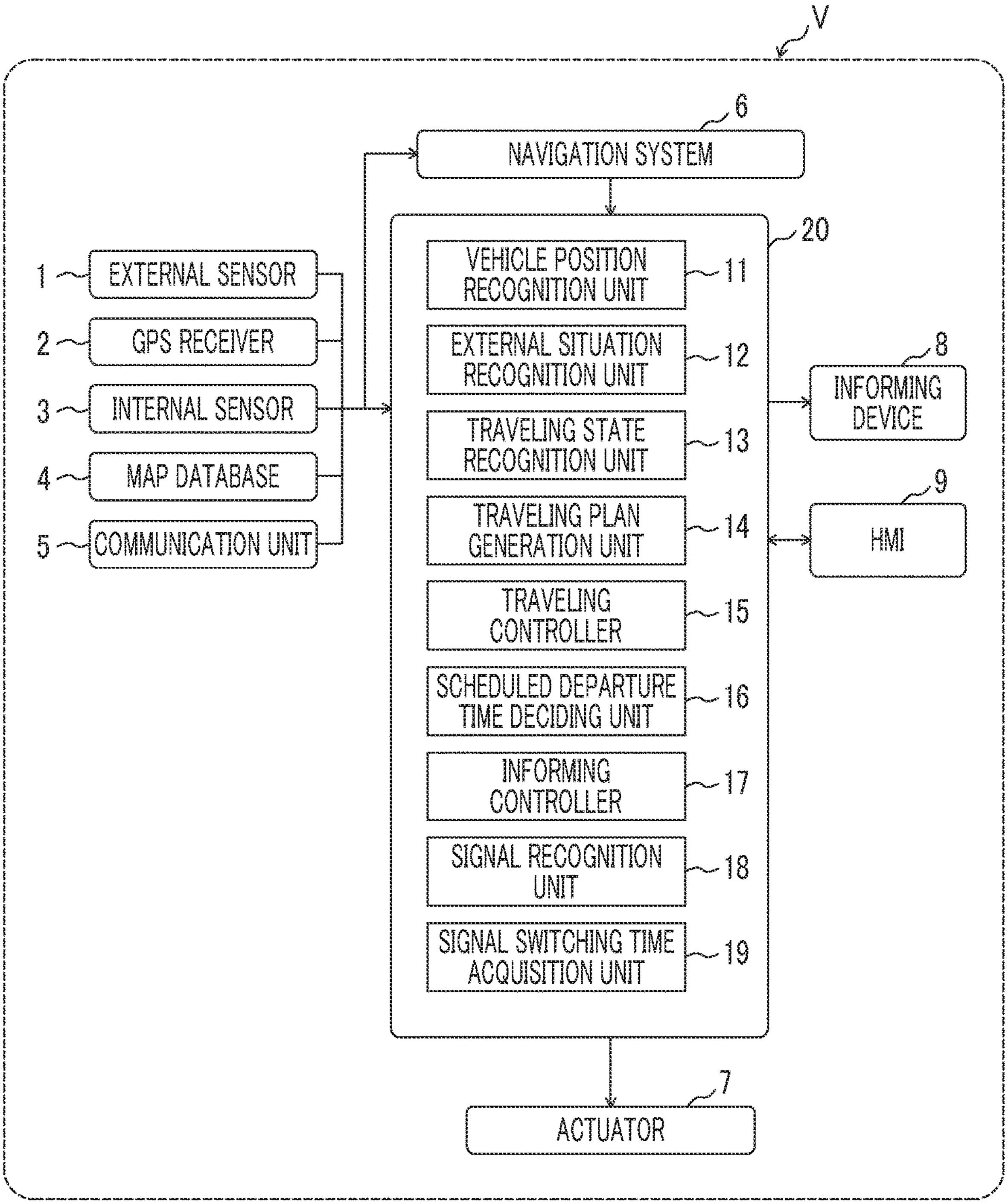
FIG. 10 is a block diagram showing a configuration of a vehicle on which a vehicle control device is mounted according to a second embodiment.

FIG. 10 is a block diagram showing a configuration of the vehicle V on which a vehicle control device 20 is mounted according to the second embodiment. As shown in FIG. 10, the vehicle control device 20 according to the embodiment differs from the first embodiment in that a human machine interface (HMI) 9, a signal recognition unit 18, and a signal switching time acquisition unit 19 are included.

The HMI 9 is an interface for inputting and outputting information with the occupant of the vehicle V. Examples of the HMI 9 may include a display panel for displaying image information to the occupant, the speaker for audio output, and an operation button or a touch panel for the occupant to perform an input operation. The HMI 9 displays the image information according to the control signal from the vehicle control device 20 on the display.

The signal recognition unit 18 recognizes the traffic signal around the path of the vehicle V from the detection result of the external sensor 1 and the traveling plan generated by the traveling plan generation unit 14. For example, when a traveling plan in which the vehicle V makes a right turn at a four-direction intersection is generated, it is possible to recognize a crossing person signal by pattern matching from an image captured by the camera and extract a crossing person signal of a right turn destination. The signal recognition unit 18 recognizes a color of a signal on which the traffic signal lights when the traffic signal is recognized.

The signal switching time acquisition unit 19 acquires a time until the signal of the traffic signal, recognized by the signal recognition unit 18, around the path of the vehicle V is switched. The time until the signal is switched is a time until the color of the traffic signal changes to another color. In the embodiment, the signal switching time acquisition unit 19 acquires a time until a color of the crossing person signal changes from green to red. As a modification example, a time until the green signal switches to a green blinking signal may be acquired as the switching time. The signal switching time acquisition unit 19 acquires the time until the signal of the crossing person signal is switched from the outside of the vehicle by communication through the communication unit 5. The signal switching time acquisition unit 19 may acquire an installation position of the crossing person signal around the path of the vehicle V and the time until the signal is switched by the communication through the communication unit 5 without using a recognition result of the signal recognition unit 18.

Hereinafter, as will be described with reference to FIGS. 11A to 14, the scheduled departure time deciding unit 16 decides the scheduled departure time of the vehicle V based on presence or absence of the traffic signal around the path of the vehicle, whether a signal switching time can be acquired, a comparison between the signal switching time and the crossing completion time, and the signal switching time or the crossing completion time. In the case, the scheduled departure time of the vehicle V may be decided as the signal switching time acquired by the signal switching time acquisition unit 19 or a time obtained by adding a predetermined time to the calculated crossing completion time of the crossing person in order to have a margin. When the crossing person signal is not recognized by the signal recognition unit 18, the scheduled departure time deciding unit 16 may function similarly to the scheduled departure time deciding unit 16 according to the first embodiment.

Here, a relationship between a vehicle signal and the crossing person signal, a crossing state of the crossing person, and whether the vehicle can advance will be described with reference to tables of FIGS. 11A and 11B. FIG. 11A is the table representing whether the vehicle V can advance with respect to a state of the vehicle signal, a state of a pedestrian signal, and a crossing state of the crossing person.

In FIG. 11A, when the vehicle signal with respect to the vehicle V is red, the vehicle V cannot depart regardless of the pedestrian signal and the crossing state of the crossing person. Since there is a possibility that the crossing person is prevented from crossing while the crossing person crosses before the path or over the path of the vehicle, the vehicle V cannot depart regardless of the state of the pedestrian signal. When the vehicle signal is green and all crossing persons already pass through the path of the vehicle V even while the crossing person crosses, or the all crossing persons complete the crossing of the entire width of the road, since there is no possibility that the crossing person is prevented from crossing, the vehicle V can depart.

In FIG. 11A, a situation where both the pedestrian signal and the vehicle signal are green is when the vehicle V makes a left or right turn at an intersection where the crossing person crosses. That is, when the crossing person crosses at a left or right turn destination of the vehicle V, both the signals may be green. In the case, the vehicle V may depart as soon as the crossing person completes the crossing over the path of the vehicle V.

FIG. 11B is the table representing whether informing of a scheduled departure time by the vehicle V is needed with respect to the state of the vehicle signal, the state of the pedestrian signal, and the crossing state of the crossing person. However, the above is merely an example, and presence or absence of the informing may be changed.

In FIG. 11B, when the crossing person completes the crossing, the vehicle V may not perform the informing with respect to the crossing person regardless of the state of the vehicle signal or the pedestrian signal. When both the vehicle signal and the pedestrian signal are red, since the vehicle V does not depart before the vehicle signal becomes green, there is no need to inform the crossing person of the scheduled departure time. On the other hand, when there is a situation where the vehicle signal becomes green even when both the vehicle signal and the pedestrian signal are red, the crossing person may be informed of the scheduled departure time based on a switching time of the signal.

In FIG. 11B, when the vehicle signal is green while the crossing person crosses, since the vehicle V departs after the crossing person completes the crossing, the informing of the scheduled departure time is desired with respect to the crossing person. Even when the vehicle signal is red and the pedestrian signal is green, when the crossing person crosses before the path or over the path of the vehicle, the informing may be performed considering a possibility that the signals may be switched before the crossing person completes the crossing.

Pieces of processing executed by the vehicle control device 20 will be described in detail with reference to flowcharts of FIGS. 12 to 14.

Figure 12:
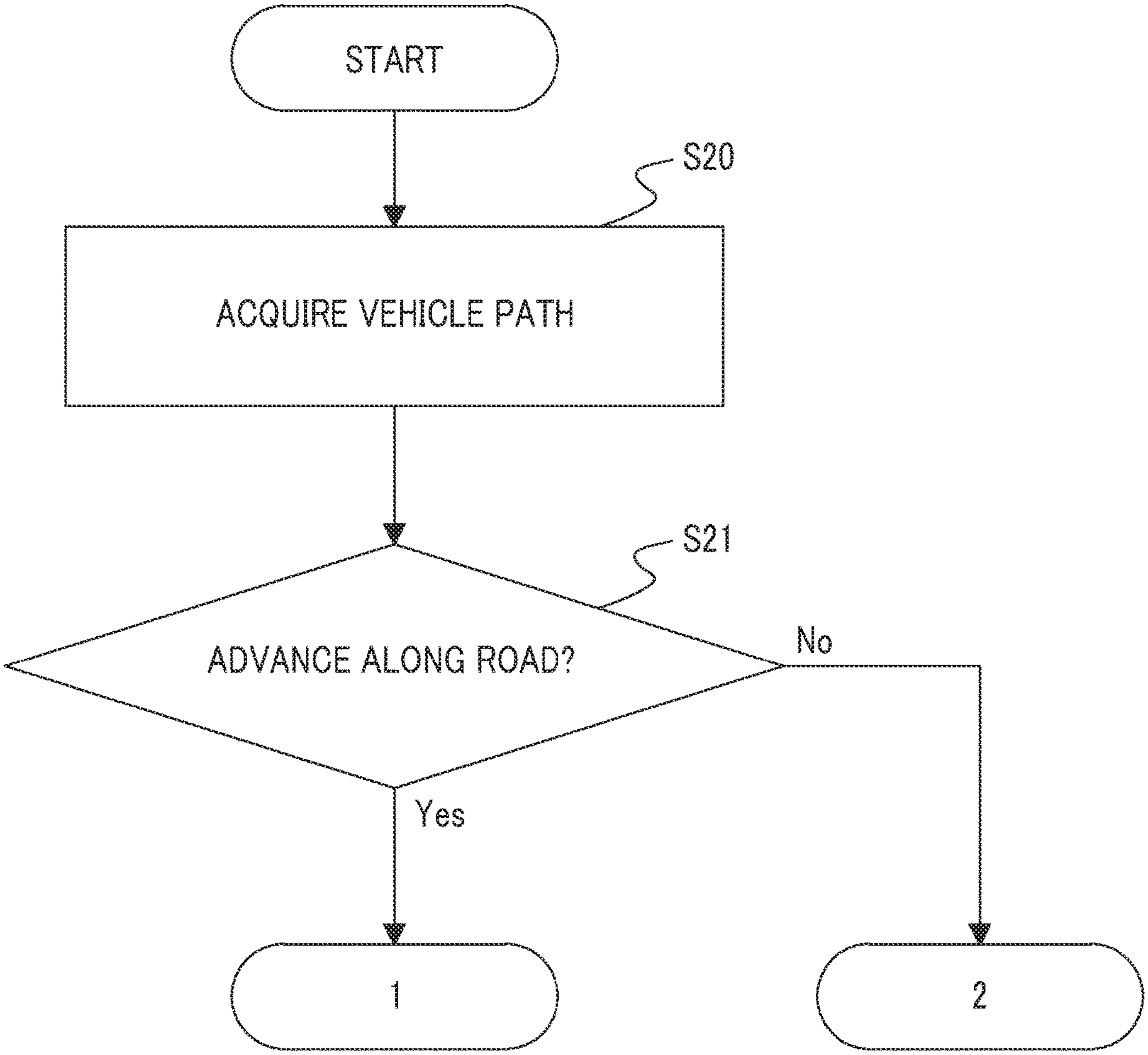
FIG. 12 is a part of a flowchart showing a series of pieces of processing by the vehicle control device according to the second embodiment.

FIG. 12 is a part of the flowchart showing the pieces of processing of the vehicle control device 20. Here, the vehicle control device 20 configured to decide the scheduled departure time based on any of the crossing completion time and the signal switching time according to a situation of the vehicle V will be described. In FIG. 12, as an example of the situation of the vehicle V, a flow of a control to decide the scheduled departure time based on any of the crossing completion time and the signal switching time depending on two patterns as to whether the vehicle V on the path of the vehicle V advances along a currently traveling road is switched. The advance along the road means that the vehicle V advances the currently traveling road without accompanying the left or right turn. In the vehicle control device 20, first, the path of the vehicle is acquired from the traveling plan generated by the traveling plan generation unit 14 (S20). In step S21, determination is made whether the vehicle V on the path of the vehicle V advances along the currently traveling road acquired in step S20 (S21). When the vehicle V is determined to advance along the road (S21: Yes), the processing proceeds to a flow shown in FIG. 13 (branch 1). When the vehicle V is not determined to advance along the road (S21: No), the processing proceeds to a flow shown in FIG. 14 (branch 2).

Figure 13:
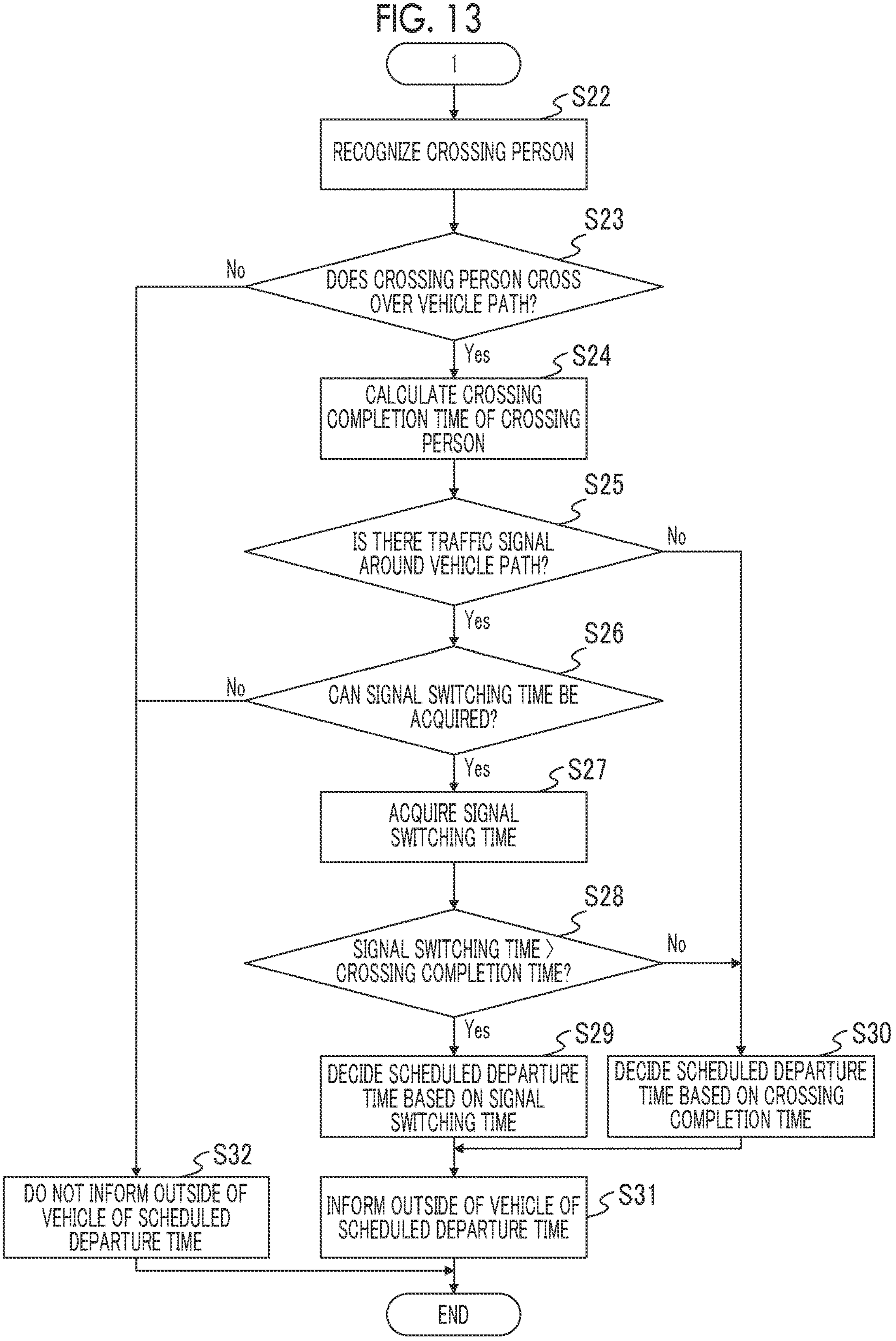
FIG. 13 is a part of the flowchart showing the series of pieces of processing by the vehicle control device according to the second embodiment and shows processing when the vehicle travels along a road.

FIG. 13 is the flowchart showing the pieces of processing when the processing proceeds to the branch 1 in step S21 of FIG. 12. Hereinafter, as an example when the vehicle travels along the road, the series of pieces of processing will be described appropriately using FIGS. 15 and 16 as overhead views representing situations around the vehicle V traveling straight on the road.

When the vehicle is determined to advance along the road in step S21 of FIG. 12, in step S22, a crossing person around the vehicle V is recognized by the external situation recognition unit 12, and the processing proceeds to step S23 (S22).

In step S23, determination is made whether the crossing person who crosses over the path of the vehicle V is present from the recognition result in step S22. When the crossing person who crosses over the path of the vehicle V is determined to be present in step S23, the processing proceeds to step S24 (S23: Yes). When the crossing person who crosses over the path of the vehicle V is not determined to be present in step S23, the processing proceeds to step S32 (S23: No).

In step S24, the scheduled departure time deciding unit calculates the crossing completion time of the crossing person from the recognition result of the external situation recognition unit 12, and the processing proceeds to step S25. In step S25, determination is made by the signal recognition unit 18 whether a crossing person signal is present around the path of the vehicle V. When the crossing person signal is determined to be present around the path of the vehicle V, the processing proceeds to step S26 (S25: Yes). When the crossing person signal is not determined to be present around the path of the vehicle V, the processing proceeds to step S30 (S25: No).

In step S26, when the crossing person signal is determined to be present around the path of the vehicle in step S25, determination is made by the signal switching time acquisition unit 19 whether the signal switching time of the crossing person signal can be acquired. When determination is made that the signal switching time of the crossing person signal can be acquired, the processing proceeds to step S27 (S26: Yes). When the determination is not made that the signal switching time of the crossing person signal can be acquired, the processing proceeds to step S32 since the scheduled departure time cannot be decided (S26: No). When the determination is not made that the signal switching time of the crossing person signal can be acquired in step S26, the HMI 9 may notify the occupant of the vehicle V that the signal switching time of the crossing person signal cannot be acquired.

In step S27, the signal switching time acquisition unit 19 acquires the signal switching time, and the processing proceeds to step S28. In step S28, the scheduled departure time deciding unit 16 compares the signal switching time acquired in step S27 with the crossing completion time calculated in step S24 to determine whether the signal switching time is longer than the crossing completion time. In step S28, when the signal switching time is determined to be longer than the crossing completion time, the processing proceeds to step S29 (S28: Yes). In step S28, when the signal switching time is not determined to be longer than the crossing completion time, the processing proceeds to step S30 (S28: No).

Figure 15:
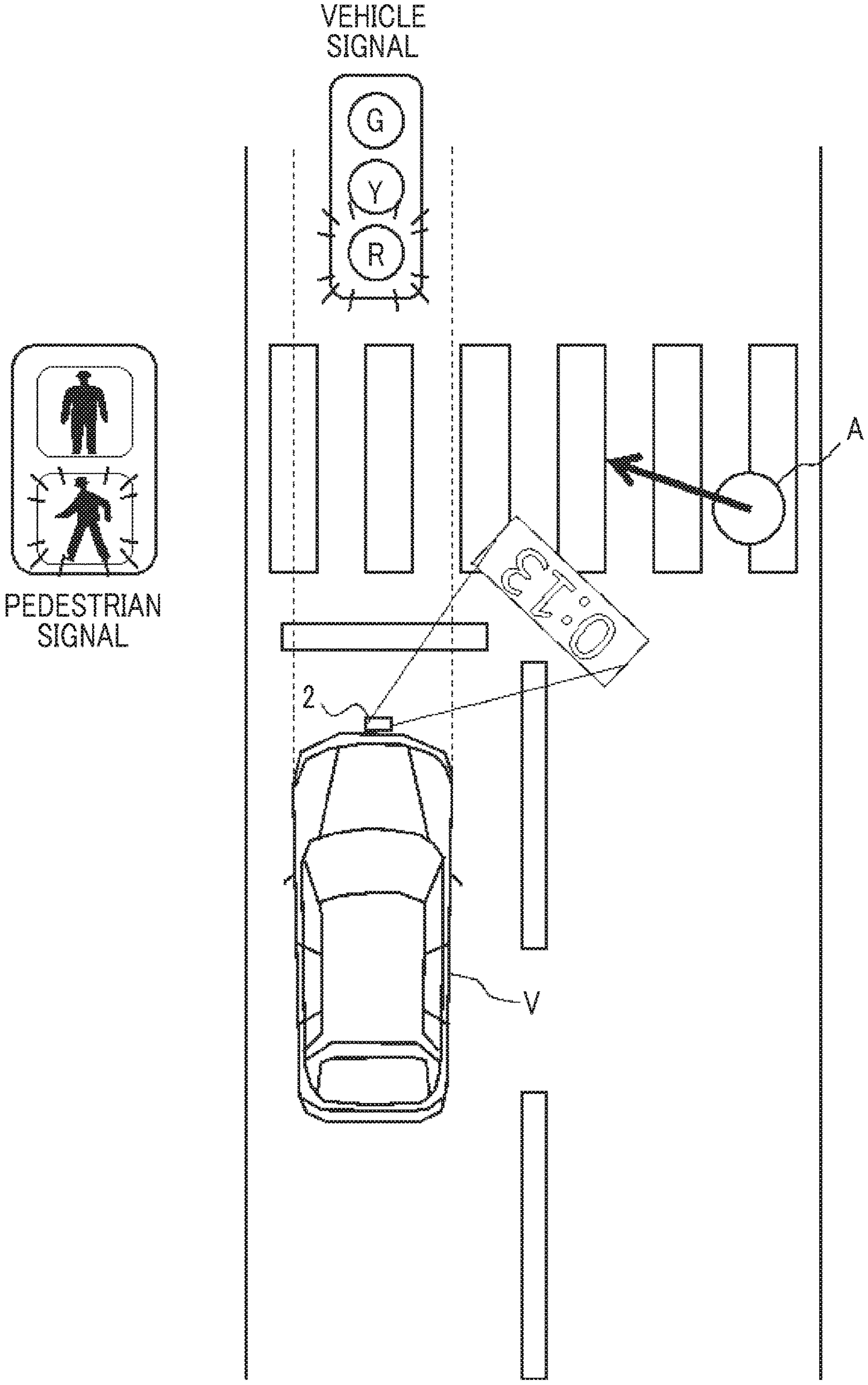
FIG. 15 is an overhead view for describing an operation of the vehicle control device according to the second embodiment when a crossing person signal is green at the time of the straight traveling of the vehicle.

In step S29, the scheduled departure time deciding unit 16 decides the scheduled departure time of the vehicle V based on the signal switching time acquired by the signal switching time acquisition unit 19, and the processing proceeds to step S31. In the case, as shown in FIG. 15, the vehicle decides the scheduled departure time based on the signal switching time and performs the informing.

Figure 16:
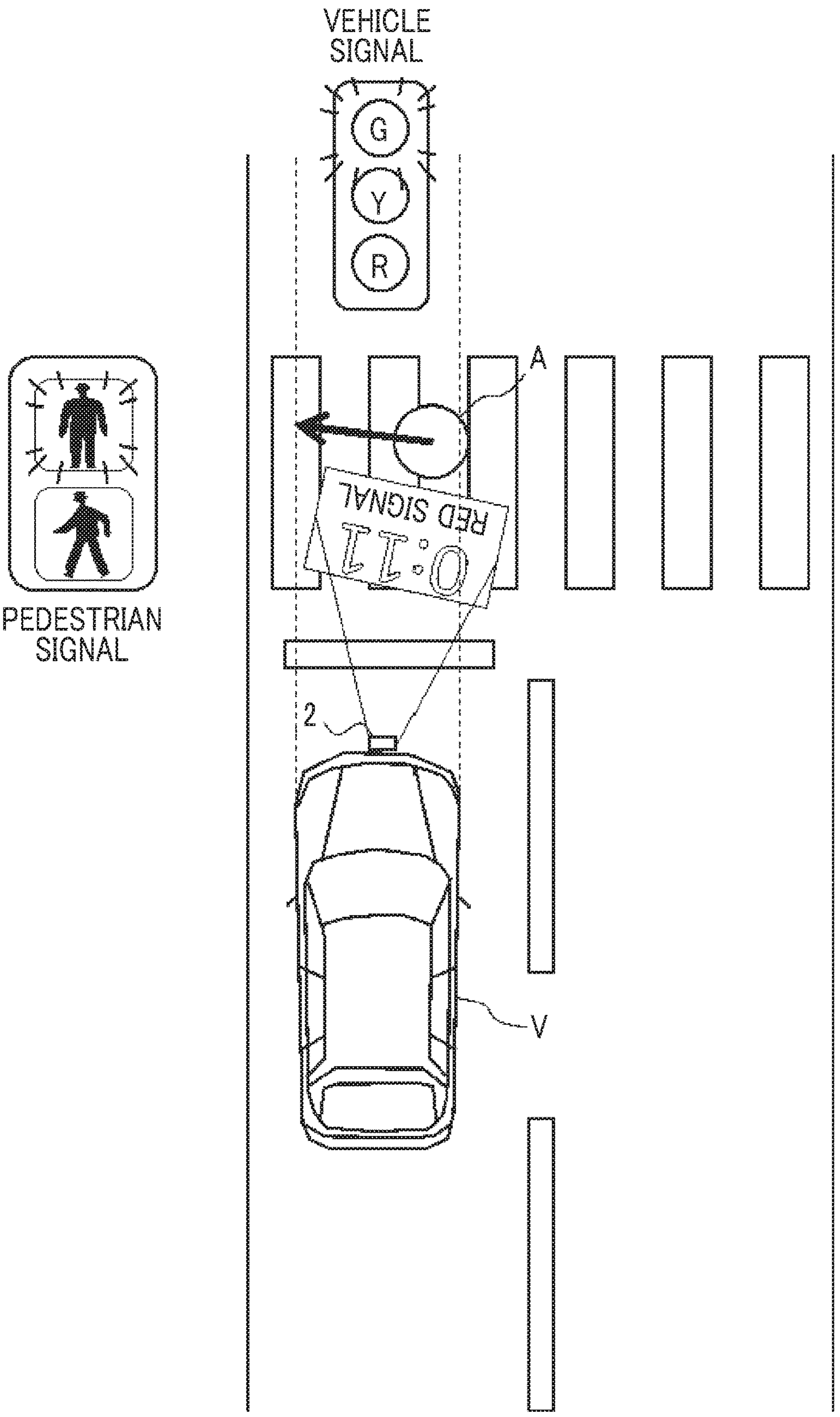
FIG. 16 is an overhead view for describing an operation of the vehicle control device according to the second embodiment when the crossing person signal is red at the time of the straight traveling of the vehicle.

In step S30, the scheduled departure time deciding unit 16 decides the scheduled departure time of the vehicle V based on the crossing completion time calculated in step S24, and the processing proceeds to step S31. In the case, as shown in FIG. 16, the vehicle decides the scheduled departure time based on the crossing completion time and performs the informing.

In step S31, the informing controller 17 controls the informing device 8 such that the informing device 8 informs the outside of the vehicle of the scheduled departure time decided by the scheduled departure time deciding unit 16 in step S29 or step S30 and ends the processing.

In step S32, the informing controller 17 does not perform the control to inform the outside of the vehicle of the scheduled departure time and ends the processing.

The case where the vehicle V is not determined to advance along the road (branch 2) in step S21 of FIG. 12 will be described with reference to FIG. 14. As an example when the vehicle does not advance along the road, a series of pieces of processing will be described appropriately using FIGS. 17 and 18 as overhead views representing situations around the vehicle V turning right on the road.

Figure 14:
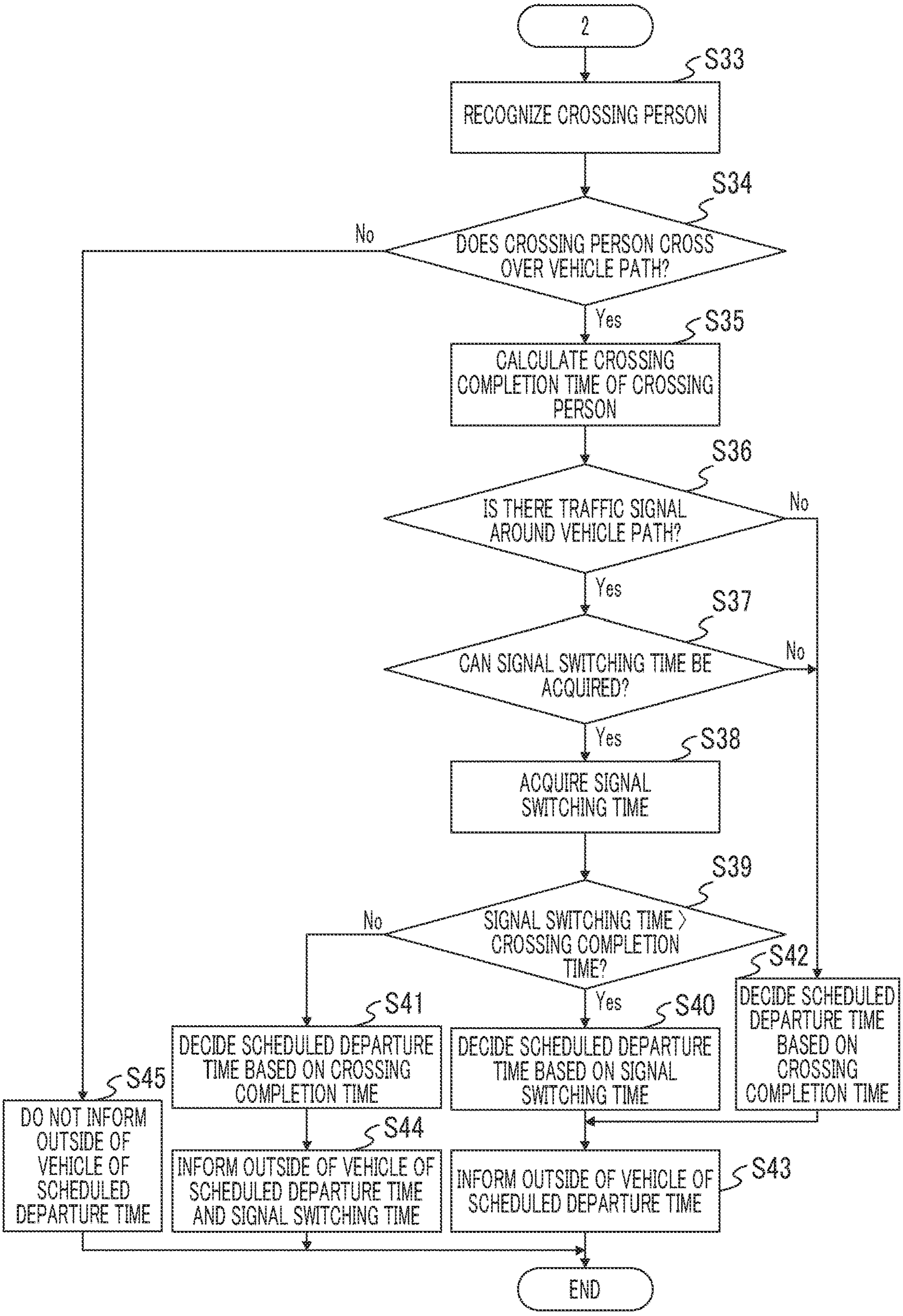
FIG. 14 is a part of the flowchart showing the series of pieces of processing by the vehicle control device according to the second embodiment and shows processing when the vehicle does not travel along a road.

FIG. 14 is the flowchart showing the pieces of processing when the processing proceeds to the branch 2 in step S21 of FIG. 12. When the vehicle is not determined to advance along the road in step S21 of FIG. 12, in step S33, the external situation recognition unit 12 recognizes a crossing person around the vehicle V, and the processing proceeds to step S34 (S33).

In step S34, determination is made whether a crossing person who crosses over the path of the vehicle V is present from the recognition result in step S33. When the crossing person who crosses over the path of the vehicle V is determined to be present in step S34, the processing proceeds to step S35 (S34: Yes). When the crossing person who crosses over the path of the vehicle V is not determined to be present in step S34, the processing proceeds to step S45 (S34: No).

In step S35, the scheduled departure time deciding unit calculates the crossing completion time of the crossing person from the recognition result of the external situation recognition unit 12, and the processing proceeds to step S36. In step S36, determination is made by the signal recognition unit 18 whether a crossing person signal is present around the path of the vehicle V. When the crossing person signal is determined to be present around the path of the vehicle V, the processing proceeds to step S37 (S36: Yes). When the crossing person signal is not determined to be present around the path of the vehicle V, the processing proceeds to step S42 (S36: No).

In step S37, when the crossing person signal is determined to be present around the path of the vehicle in step S36, determination is made by the signal switching time acquisition unit 19 whether the signal switching time of the crossing person signal can be acquired. When determination is made that the signal switching time of the crossing person signal can be acquired, the processing proceeds to step S38 (S37: Yes). When the determination is not made that the signal switching time of the crossing person signal can be acquired, the processing proceeds to step S42 (S37: No).

In step S38, the signal switching time acquisition unit 19 acquires the signal switching time, and the processing proceeds to step S39. In step S39, the scheduled departure time deciding unit 16 compares the signal switching time acquired in step S38 with the crossing completion time calculated in step S35 to determine whether the signal switching time is longer than the crossing completion time. In step S39, when the signal switching time is determined to be longer than the crossing completion time, the processing proceeds to step S40 (S39: Yes). In step S39, when the signal switching time is not determined to be longer than the crossing completion time, the processing proceeds to step S41 (S39: No).

Figure 17:
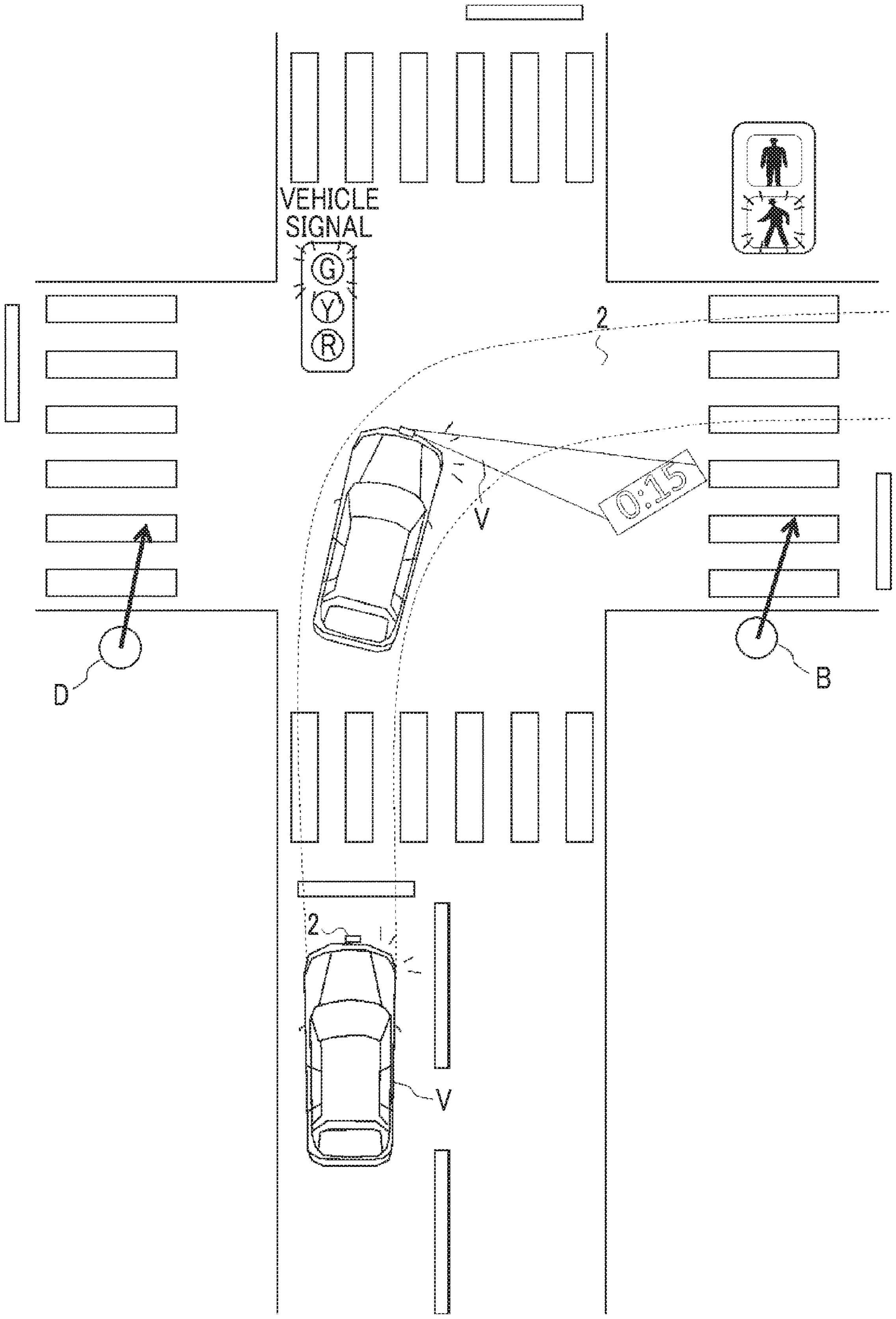
FIG. 17 is an overhead view for describing an operation of the vehicle control device according to the second embodiment when the crossing person signal is green at the time of the right turn of the vehicle.

In step S40, the scheduled departure time deciding unit 16 decides the scheduled departure time of the vehicle V based on the signal switching time acquired by the signal switching time acquisition unit 19, and the processing proceeds to step S43. In step S43, the informing controller 17 controls the informing device 8 such that the informing device 8 informs the outside of the vehicle of the scheduled departure time decided in step S40 and ends the processing. In the case, for example, as shown in FIG. 17, the scheduled departure time is decided based on the signal switching time and the informing is performed.

Figure 18:
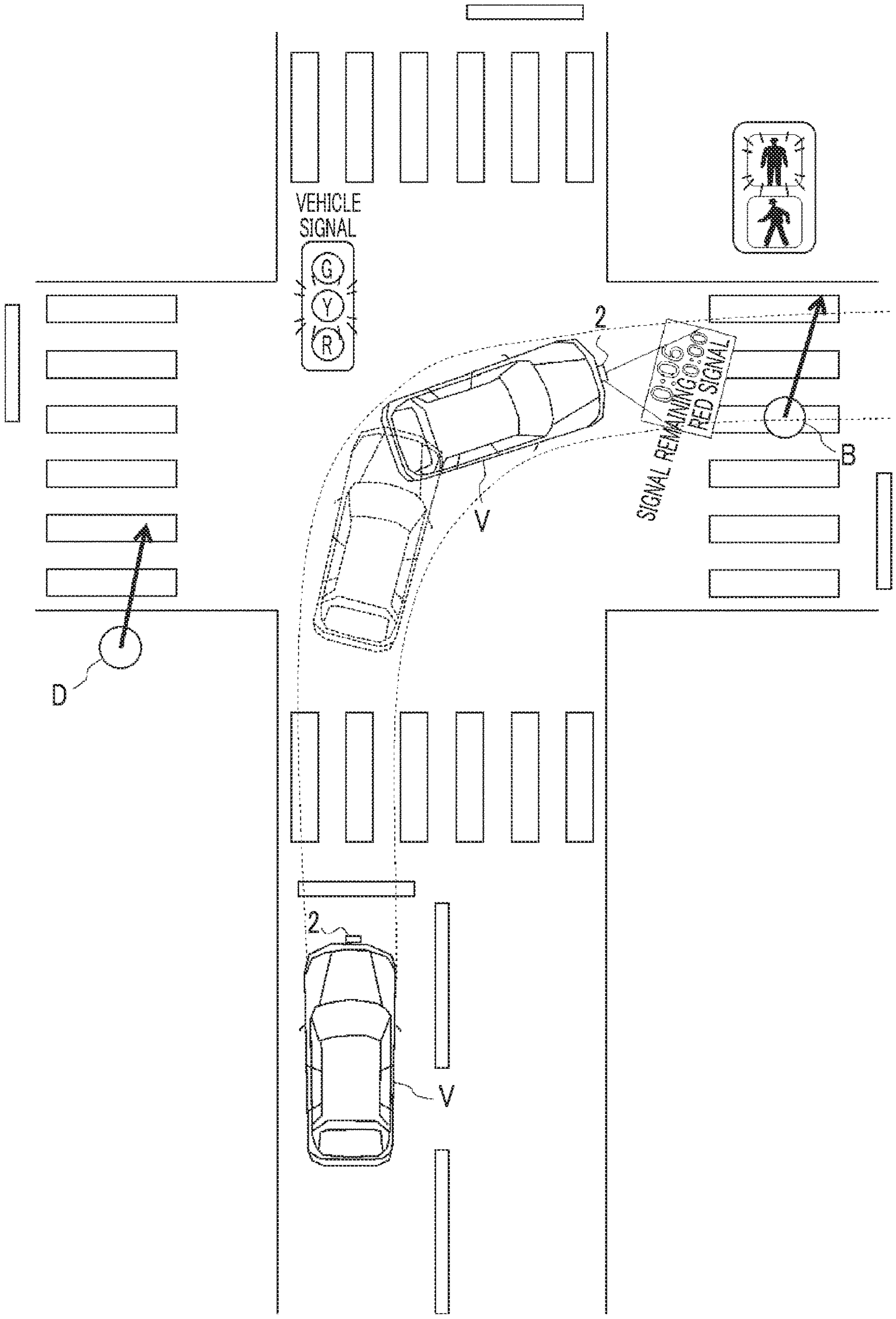
FIG. 18 is an overhead view for describing an operation of the vehicle control device according to the second embodiment when the crossing person signal is red at the time of the right turn of the vehicle.

In step S41, the scheduled departure time deciding unit 16 decides the scheduled departure time of the vehicle V based on the crossing completion time calculated in step S35, and the processing proceeds to step S44. In step S44, the informing controller 17 controls the informing device 8 such that the informing device 8 informs the outside of the vehicle of the scheduled departure time decided in step S41 and the signal switching time acquired in step S38, and ends the processing. The processing in the case of step S44 is processing when the crossing completion time is longer than the signal switching time and thus the crossing person continues the crossing or the crossing is predicted even when the crossing person signal becomes a red signal. In the case, for example, it is possible to urge the crossing person to cross at an early stage by informing the crossing person of the signal switching time at the same time as shown in FIG. 18.

In step S42, the scheduled departure time deciding unit 16 decides the scheduled departure time of the vehicle V based on the crossing completion time calculated in step S35, and the processing proceeds to step S43.

In step S45, the informing controller 17 does not perform the control to inform the outside of the vehicle of the scheduled departure time and ends the processing.

According to the embodiment, the scheduled departure time is decided by adding the time until the crossing person signal switches from green to another color. Therefore, it is possible to prevent the crossing person from being informed of different information between the crossing person signal and the vehicle. It is possible to appropriately decide the scheduled departure time considering whether the vehicle V advances along the road.

As a modification example of the embodiment, the scheduled departure time of the vehicle V may be decided based on the crossing completion time also in step S40 of FIG. 14. In the above description, as shown in FIGS. 11A and 11B, when the vehicle V does not advance along the road, both the crossing person signal and the vehicle signal may be green as in FIG. 17. In the case, the vehicle V may depart at a timing when the crossing person does not interfere with the path of the vehicle V. However, the scheduled departure time is desired to be decided after the pedestrian passes through the path of the vehicle from a viewpoint of pedestrian priority.

In the above description, the embodiment of the disclosure is described, but the disclosure is not limited to the embodiments. In the first embodiment and the second embodiment, the vehicle V has the autonomous driving control function by the traveling plan generation unit 14 and the traveling controller 15. However, in the manual driving vehicle, the path of the vehicle V may be predicted based on operation input by the driver of the vehicle V, and determination may be made whether the crossing person crosses over the predicted path. In the case of the manual driving vehicle, the path is predicted by using the target route acquired by the navigation system 6, information on the driving operation (turn signal operation and steering angle) by the driver, the detection information of the face direction and the line of sight of the driver acquired from a driver monitor camera, and the like. In the case, a notification for urging the driver of the vehicle V to depart after the scheduled departure time elapses may be performed instead of employing the traveling plan in which the vehicle V departs after the scheduled departure time decided by the scheduled departure time deciding unit elapses. When the vehicle V is the manual driving vehicle, the traveling controller 15 may perform a control to suppress the departure of the vehicle V even though the driver of the vehicle V operates an accelerator pedal until the scheduled departure time elapses.

The vehicle control device according to the embodiments may have a driving assistance control function instead of the autonomous driving control function. In the case, for example, the traveling plan generation unit 14 generates a short period traveling plan in a longitudinal direction or both longitudinal and lateral directions of the vehicle V based on the traveling state recognized by the traveling state recognition unit 13, and the traveling controller 15 performs a driving assistance control to assist a driving action of the driver of the vehicle V based on the generated short period traveling plan. When the driving assistance control function as described above is included, the driving assistance control to urge the driver of the vehicle V to depart after the scheduled departure time elapses may be performed. The traveling controller 15 may perform the control to suppress the departure of the vehicle V even though the driver of the vehicle V operates the accelerator pedal until the scheduled departure time elapses.

In the embodiments, the environment information around a host vehicle is acquired by the external sensor 1. However, the surrounding environment information may be acquired based on communication information by vehicle-to-vehicle communication, the road-to-vehicle communication, or pedestrian-to-vehicle communication instead of or in addition to the external sensor 1. In the embodiments of the disclosure, some of each function of the vehicle V may be executed by a computer of the facility such as an information processing center capable of communicating with the host vehicle.

Figure 19:
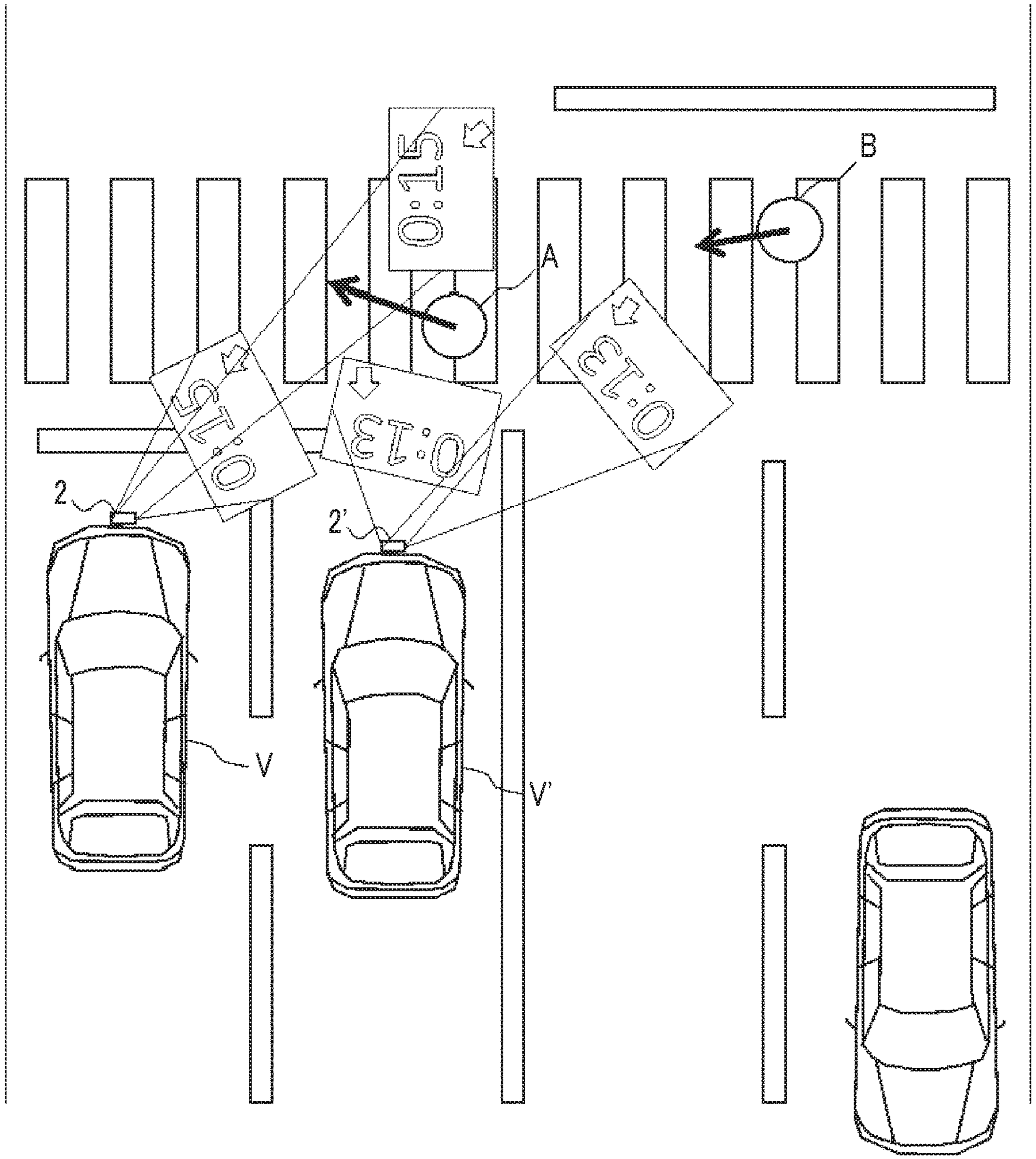
FIG. 19 is an overhead view for describing an operation of the vehicle control device in another modification example of the first embodiment of the disclosure when a plurality of vehicles including the vehicle control device is present in the periphery.

As a further modification example of the first embodiment and the second embodiment, the informing controller 17 may control the informing device 8 such that the informing device 8 displays the scheduled departure times, arrows pointing in directions of the vehicles V, and the like as pieces of information indicating positions of the vehicles V as shown in FIG. 19.

What is claimed is:

1. A vehicle control device comprising:
a processor configured to:
generate a traveling plan of a vehicle;
recognize a crossing person who crosses over a path of a vehicle that is obtained from the traveling plan;
acquire, from an external sensor, information of the crossing person including a speed of the crossing person;
predict a crossing completion time at which the crossing person completes the crossing based on the speed of the crossing person;
decide a scheduled departure time of the vehicle based on the crossing completion time; and
perform a control to inform an outside of the vehicle, in a manner recognized by the crossing person, of the scheduled departure time, wherein the scheduled departure time is a dynamically changing countdown showing a remaining time from a current time to a time the vehicle departs,
wherein, when the crossing person is not recognized, not perform the control to inform the outside of the vehicle of the scheduled departure time.

2. A non-transitory storage medium storing instructions that are executable by one or more processors of an electronic control unit (ECU) mounted in a vehicle and cause the one or more processors to perform functions, the functions comprising:
generating a traveling plan of the vehicle;
recognizing a crossing person who crosses over a path of a vehicle that is obtained from the traveling plan;
acquiring, from an external sensor, information of the crossing person including a speed of the crossing person;
predicting a crossing completion time at which the crossing person completes the crossing based on the speed of the crossing person;
deciding a scheduled departure time of the vehicle based on the crossing completion time; and
performing a control of informing an outside of the vehicle, in a manner recognized by the crossing person, of the scheduled departure time, wherein the scheduled departure time is a dynamically changing countdown showing a remaining time from a current time to a time the vehicle departs,
wherein, when no crossing person is recognized, the informing to the outside of the vehicle of the scheduled departure time is not performed.

3. The vehicle control device according to claim 1, wherein the processor is further configured to:
recognize a traffic signal on a road around the path of the vehicle; and
acquire a signal switching time until a signal of the traffic signal switches,
wherein when a traffic signal is recognized, a signal switching time is acquired, and when the signal switching time is longer than the crossing completion time, decide the scheduled departure time based on the signal switching time.

4. The vehicle according to claim 1, wherein the processor is further configured to inform the crossing person of the scheduled departure time by displaying a visual display in a direction of the crossing person.

5. The vehicle control device according to claim 1, wherein the processor causes a display of the informing of the scheduled departure time on a road surface between the vehicle and the crossing person.

6. A control method of informing an outside of a vehicle, executed by one or more processors of an electronic control unit (ECU) mounted in the vehicle, comprising:
generating, using the ECU, a traveling plan of the vehicle;
recognizing, using the ECU, a crossing person who crosses over a path of a vehicle that is obtained from the traveling plan;
acquiring, from an external sensor, information of the crossing person including a speed of the crossing person;
predicting, using the ECU, a crossing completion time at which the crossing person completes the crossing based on the speed of the crossing person;
deciding, using the ECU, a scheduled departure time of the vehicle based on the crossing completion time; and
performing, using the ECU, a control of informing an outside of the vehicle, in a manner recognized by the crossing person, of the scheduled departure time, wherein the scheduled departure time is a dynamically changing countdown showing a remaining time from a current time to a time the vehicle departs, wherein, when no crossing person is recognized, the informing to the outside of the vehicle of the scheduled departure time is not performed.

7. The non-transitory storage medium according to claim 2, the functions further comprising:

recognizing, using the ECU, a traffic signal on a road around the path of the vehicle; and acquiring, using the ECU, a signal switching time until a signal of the traffic signal switches, wherein when a traffic signal is recognized, acquiring a signal switching time, and when the signal switching time is longer than the crossing completion time, deciding the scheduled departure time based on the signal switching time.

8. The control method according to claim 6, further comprising:

recognizing, using the ECU, a traffic signal on a road around the path of the vehicle; and acquiring, using the ECU, a signal switching time until a signal of the traffic signal switches, wherein when a traffic signal is recognized, acquiring a signal switching time, and when the signal switching time is longer than the crossing completion time, deciding the scheduled departure time based on the signal switching time.

9. The control method according to claim 6, wherein the performing the control of informing the crossing person of the scheduled departure time includes displaying a visual display in a direction of the crossing person.

10. The control method according to claim 6, wherein the performing the control of informing the crossing person includes displaying the scheduled departure time on a road surface between the vehicle and the crossing person.

11. The non-transitory storage medium according to claim 2, wherein the performing the control of informing the crossing person of the scheduled departure time includes displaying a visual display in a direction of the crossing person.

12. The non-transitory storage medium according to claim 2, wherein the performing the control of informing the crossing person includes displaying the scheduled departure time on a road surface between the vehicle and the crossing person.

* * * * *